United States Patent
Murray et al.

(10) Patent No.: US 10,932,150 B2
(45) Date of Patent: Feb. 23, 2021

(54) BEAM MANAGEMENT

(71) Applicant: CONVIDA WIRELESS, LLC, Wilmington, DE (US)

(72) Inventors: Joseph M. Murray, Schwenksville, PA (US); Pascal M. Adjakple, Great Neck, NY (US); Wei Chen, San Diego, CA (US); Lakshmi R. Iyer, King Of Prussia, PA (US); Qian Zhang, Basking Ridge, NJ (US); Guodong Zhang, Woodbury, NY (US); Allan Y. Tsai, Boonton, NJ (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 16/323,796

(22) PCT Filed: Aug. 11, 2017

(86) PCT No.: PCT/US2017/046547
§ 371 (c)(1),
(2) Date: Feb. 7, 2019

(87) PCT Pub. No.: WO2018/031908
PCT Pub. Date: Feb. 15, 2018

(65) Prior Publication Data
US 2019/0174346 A1    Jun. 6, 2019

Related U.S. Application Data

(60) Provisional application No. 62/373,617, filed on Aug. 11, 2016.

(51) Int. Cl.
*H04W 24/10*    (2009.01)
*H04B 7/06*    (2006.01)
(Continued)

(52) U.S. Cl.
CPC .......... *H04W 24/10* (2013.01); *H04B 7/0408* (2013.01); *H04B 7/0456* (2013.01);
(Continued)

(58) Field of Classification Search
CPC ... H04W 24/10; H04W 16/28; H04W 72/046; H04W 80/02; H04B 7/0408; H04B 7/0456; H04B 7/0695; H04L 5/0048
See application file for complete search history.

(56) References Cited

U.S. PATENT DOCUMENTS

| 2016/0190686 A1 | 6/2016 | Gao et al. |
| 2017/0195033 A1 | 7/2017 | Zhang et al. |

(Continued)

FOREIGN PATENT DOCUMENTS

| KR | 10-2015-0105710 A | 9/2015 |
| KR | 10-2016-0015821 A | 2/2016 |

(Continued)

OTHER PUBLICATIONS

3GPP TR 22.891 V1.3.2, 3rd Generation Partnership Project; Technical Specification Group Services and System Aspects; Feasibility Study on New Services and Markets Technology Enablers; Stage 1 (Release 14), Feb. 2016, 95 pages.

(Continued)

*Primary Examiner* — Eric Myers
(74) *Attorney, Agent, or Firm* — BakerHostetler

(57) ABSTRACT

Layer 2 structures and procedures may be used for beam management in new radio networks. In a first example, a new radio layer 2 structure may be used to facilitate beam management at the medium access control sublayer. In a second example, new radio feedback mechanisms may be signaled between peer medium access control entities and used to assist with beam management. In a third example, new radio beam management procedures may include new (Continued)

radio beam training, new radio beam alignment, new radio beam tracking, or new radio beam configuration. In a fourth example, new radio connection control procedure may include new radio initial access or new radio mobility management.

20 Claims, 35 Drawing Sheets

(51) Int. Cl.
  *H04B 7/0408*   (2017.01)
  *H04B 7/0456*   (2017.01)
  *H04L 5/00*     (2006.01)
  *H04W 16/28*    (2009.01)
  *H04W 72/04*    (2009.01)
  *H04W 80/02*    (2009.01)

(52) U.S. Cl.
  CPC ......... *H04B 7/0695* (2013.01); *H04L 5/0048* (2013.01); *H04W 16/28* (2013.01); *H04W 72/046* (2013.01); *H04W 80/02* (2013.01)

(56) References Cited

U.S. PATENT DOCUMENTS

| 2017/0195998 | A1 | 7/2017 | Zhang et al. | |
| 2017/0366994 | A1* | 12/2017 | Akkarakaran | H04B 7/0617 |
| 2018/0323848 | A1* | 11/2018 | Mizusawa | H04B 7/04 |

FOREIGN PATENT DOCUMENTS

| KR | 10-2016-0042793 A | 4/2016 |
| KR | 10-2016-0082926 A | 7/2016 |
| WO | 2016/044991 A1 | 3/2016 |
| WO | 2016/044994 A1 | 3/2016 |

OTHER PUBLICATIONS

3GPP TR 38.913 V0.3.0, 3rd Generation Partnership Project; Technical Specification Group Radio Access Network; Study on Scenarios and Requirements for Next Generation Access Technologies; (Release 14), Mar. 2016, 30 pages.

3GPP TS 36.300 V13.3.0, Technical Specification, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", Mar. 2016, 295 pges.

3GPP TS 36.304 V13.0.0, 3rd Generation Partnership Project; Technical Specification Group Radio Access network; Evolved Universal Terrestrial Radio Access (E-UTRA); User Equipment (UE) Procedures in Idle Mode (Release 13), Dec. 2015, 42 pages.

3GPP Ts 36.331 V13.0.0, Technical Report, "3rd Generation Partnership Project; Technical Specification Group Radio Access Network; Evolved Universal Terrestrial Radio Access (E-UTRA); Radio Resource Control (RRC); Protocol Specification (Release 13)", Dec. 2015, 507 pages.

3GPP TSG RAN Meeting #72 RP-161214, NTT DOCOMO, "Revision of SI: Study on New Radio Access Technology", Jun. 2016, 8 pages.

3GPP TSG-RAN WG2 Meeting #93bis R2-162366, Nokia, et al., "Beam Forming Impacts", Apr. 2016, 3 pages.

3GPP TSGRAN WG2 Meeting #93bis R2-162571, CATT, "Introduction of Virtual Cell", Apr. 2016, 3 pages.

ETSI TS136133 V13.2.0 Technical Specification, "LTE; Evolved Universal Terrestrial Radio Access (E-UTRA); Requirements for Support of Radio Resource Management (3GPP TS 36.133 version 13.2.0 Release 13)", Apr. 2016, 1519 pages.

ITU-R Radiocommunication Sector of ITU, Recommendation ITU-R M.2083-0, "IMT Vision—Framework and Overall Objectives of the Future Development of IMT for 2020 and Beyond", Sep. 2015, 21 pages.

* cited by examiner

BEAM MANAGEMENT

CROSS-REFERENCE TO RELATED APPLICATIONS

This application is the National Stage Application of International Patent Application No. PCT/US2017/046547 filed Aug. 11, 2017, which claims the benefit of U.S. Provisional Patent Application No. 62/373,617 "BEAM MANAGEMENT" filed Aug. 11, 2016, the contents of which are incorporated herein by reference in their entireties.

BACKGROUND

RRC Protocol States

In LTE, a terminal may be in different states, as shown in FIG. 1, RRC_CONNECTED and RRC_IDLE. See 3GPP TS 36.331, Radio Resource Control (RRC); Protocol specification (Release 13), V13.0.0.

In RRC_CONNECTED, there is a Radio Resource Control (RRC) context. The cell to which the User Equipment (UE) belongs is known and an identity of the UE, the Cell Radio-Network Temporary Identifier (C-RNTI), used for signaling purposes between the UE and the network, has been configured. RRC_CONNECTED is intended for data transfer to or from the UE.

In RRC_IDLE, there is no RRC context in the Radio Access Network (RAN) and the UE does not belong to a specific cell. No data transfer may take place in RRC_IDLE. A UE in RRC_IDLE monitors a Paging channel to detect incoming calls and changes to the system information. Discontinuous Reception (DRX) is used in to conserve UE power. When moving to RRC_CONNECTED the RRC context needs to be established in both the RAN and the UE.

System Information

System Information (SI) is the information broadcast by the Evolved Universal Terrestrial Radio Access Network (E-UTRAN) that needs to be acquired by the UE to be able to access and operate within the network. SI is divided into the MasterinformationBlock (MIB) and a number of SystemInformationBlocks (SIBs). A high level description of the MIB and SIBs is provided in 3GPP TS 36.300. Detailed descriptions are available in 3GPP TS 36.331.

TABLE 1

System Information

| Information Block | Description |
| --- | --- |
| MIB | Defines the most essential physical layer information of the cell required to receive further system information |
| SIB1 | Contains information relevant when evaluating if a UE is allowed to access a cell and defines the scheduling of other system information |
| SIB2 | Radio resource configuration information that is common for all UEs |
| SIB3 | Cell re-selection information common for intra-frequency, inter-frequency and/or inter-RAT cell re-selection (i.e. applicable for more than one type of cell re-selection but not necessarily all) as well as intra-frequency cell re-selection information other than neighbouring cell related |
| SIB4 | Neighbouring cell related information relevant only for intra-frequency cell re-selection |
| SIB5 | Information relevant only for inter-frequency cell re-selection i.e. information about other E UTRA frequencies and inter-frequency neighbouring cells relevant for cell re-selection |
| SIB6 | Information relevant only for inter-RAT cell re-selection i.e. information about UTRA frequencies and UTRA neighbouring cells relevant for cell re-selection |
| SIB7 | Information relevant only for inter-RAT cell re-selection i.e. information about GERAN frequencies relevant for cell re-selection |
| SIB8 | Information relevant only for inter-RAT cell re-selection i.e. information about CDMA2000 frequencies and CDMA2000 neighbouring cells relevant for cell re-selection |
| SIB9 | Home eNB name (HNB Name) |
| SIB10 | Earthquake and Tsunami Warning System (ETWS) primary notification |
| SIB11 | ETWS secondary notification |
| SIB12 | Commercial Mobile Alert System (CMAS) notification |
| SIB13 | Information required to acquire the MBMS control information associated with one or more MBSFN areas |
| SIB14 | Extended Access Barring (EAB) parameters |
| SIB15 | MBMS Service Area Identities (SAI) of the current and/or neighbouring carrier frequencies |
| SIB16 | Information related to GPS time and Coordinated Universal Time (UTC) |
| SIB17 | Information relevant for traffic steering between E-UTRAN and WLAN |
| SIB18 | Indicates E-UTRAN supports the Sidelink UE information procedure and may contain sidelink communication related resource configuration information |
| SIB19 | Indicates E-UTRAN supports the sidelink UE information procedure and may contain sidelink discovery related resource configuration information |
| SIB20 | Contains the information required to acquire the control information associated transmission of MBMS using Single Cell-Point to Multi-point (SC-PTM) |

The UE applies the system information acquisition procedure described in 3GPP TS 36.331 to acquire the Access Stratum (AS) and Non-access Stratum (NAS) related system information that is broadcasted by the E-UTRAN. The procedure applies to UEs in RRC_IDLE and UEs in RRC_CONNECTED. See FIG. 2.

The UE applies the system information acquisition procedure for the following: 1) upon selecting (e.g. upon power on) and upon re-selecting a cell; 2) after handover completion; 3) after entering E-UTRA from another Radio Access Technology (RAT); 4) upon return from out of coverage; 5) upon receiving a notification that the System Information has changed; 6) upon receiving an indication about the presence of an ETWS notification, a CMAS notification or a notification that EAB parameters have changed; 7) upon receiving a request from CDMA2000 upper layers; and 8) upon exceeding the maximum validity duration.

Connection Mobility Control (CMC)

Connection mobility control (CMC), as described in 3GPP 36.30, is concerned with the management of radio resources in connection with idle or connected mode mobility. In idle mode, the cell reselection algorithms are controlled by setting of parameters (thresholds and hysteresis values) that define the best cell or determine when the UE should select a new cell. Also, E-UTRAN broadcasts parameters that configure the UE measurement and reporting procedures. In connected mode, the mobility of radio connections has to be supported. Handover decisions may be based on UE and eNB measurements. In addition, handover decisions may take other inputs, such as neighbor cell load, traffic distribution, transport and hardware resources and Operator defined policies into account. CMC is located in the eNB.

Layer 2 Structure

Layer 2 is split into the following sublayers: Medium Access Control (MAC), Radio Link Control (RLC) and Packet Data Convergence Protocol (PDCP) as described in 3GPP 36.300. The PDCP/RLC/MAC architecture for the downlink and uplink are shown in FIG. 3 and FIG. 4, respectively.

Physical Layer Measurements

Physical layer measurements are defined in 3GPP TS 36.300 as shown below.

The physical layer measurements to support mobility are classified as:
within E-UTRAN (intra-frequency, inter-frequency);
between E-UTRAN and GERAN/UTRAN (inter-RAT);
between E-UTRAN and non-3GPP RAT (Inter 3GPP access system mobility).

For measurements within E-UTRAN two basic UE measurement quantities shall be supported:
Reference signal received power (RSRP);
Reference signal received quality (RSRQ).

In addition, the following UE measurement quantity may be supported:
Received signal strength indicator (RSSI);
Reference signal to noise and interference ratio (RS-SINR).

RSRP measurement is based on the following signals:
Cell-specific reference signals; or
CSI reference signals in configured discovery signals.

RSRP Measurement Report Mapping

RSRP measurement report mapping is defined in 3GPP TS 36.133 as shown below. The reporting range of RSRP is defined from −140 dBm to −44 dBm with 1 dB resolution.

The mapping of measured quantity is defined in Table 2. The range in the signaling may be larger than the guaranteed accuracy range.

TABLE 2

RSRP Measurement Report Mapping

| Reported value | Measured quantity value | Unit |
| --- | --- | --- |
| RSRP_00 | RSRP < −140 | dBm |
| RSRP_01 | −140 ≤ RSRP < −139 | dBm |
| RSRP_02 | −139 ≤ RSRP < −138 | dBm |
| . . . | . . . | . . . |
| RSRP_95 | −46 ≤ RSRP < −45 | dBm |
| RSRP_96 | −45 ≤ RSRP < −44 | dBm |
| RSRP_97 | −44 ≤ RSRP | dBm |

Multi-Antenna Transmission

Multi-antenna transmission in LTE can be described as a mapping from the output of the data modulation to the different antenna ports as shown in FIG. 5. The input to the antenna mapping consists of the modulation symbols (QPSK, 16QAM, 64QAM) corresponding to one or two transport blocks. The output of the antenna mapping is a set of symbols for each antenna port. The symbols of each antenna port are subsequently applied to the OFDM modulator—that is, mapped to the basic OFDM time—frequency grid corresponding to that antenna port.

The different multi-antenna transmission schemes correspond to different so-called transmission modes. There are ten different transmission modes defined for LTE. They differ in terms of the specific structure of the antenna mapping, but also in terms of what reference signals are assumed to be used for demodulation (cell-specific reference signals or demodulation reference signals respectively) and the type of CSI feedback they rely on.

The list below summarizes the transmission modes defined for LTE and the associated multi-antenna transmission schemes.

Transmission mode 1: Single-antenna transmission.
Transmission mode 2: Transmit diversity.
Transmission mode 3: Open-loop codebook-based precoding in the case of more than one layer, transmit diversity in the case of rank-one transmission.
Transmission mode 4: Closed-loop codebook-based precoding.
Transmission mode 5: Multi-user-MIMO version of transmission mode 4.
Transmission mode 6: Special case of closed-loop codebook-based precoding limited to single layer transmission.
Transmission mode 7: Release-8 non-codebook-based precoding supporting only single-layer transmission.
Transmission mode 8: Release-9 non-codebook-based precoding supporting up to two layers.
Transmission mode 9: Release-10 non-codebook-based precoding supporting up to eight layers.
Transmission mode 10: Release 11 Extension of transmission mode 9 for enhanced support of different means of downlink multi-point coordination and transmission, also referred to as CoMP.

SUMMARY

Disclosed herein is a L2 structure and procedures that may be used for beam management in new radio (NR) networks. In a first example, an NR L2 structure may be used to facilitate beam management at the MAC sublayer. In a second example, NR feedback mechanisms may be signaled between peer MAC entities and used to assist with beam management. In a third example, NR Beam Management procedures may include NR Beam Training, NR Beam Alignment, NR Beam Tracking, or NR Beam Configuration. In a fourth example, NR Connection Control Procedure may include NR Initial Access or NR Mobility Management.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EXAMPLES

Disclosed herein are L2 structures and procedures that may be used for beam management of a wireless network. A L2 Structure may be used to facilitate beam management at the medium access control (MAC) sublayer.

Disclosed are feedback mechanisms that may be signaled between peer MAC entities and used to assist with beam management. In an example, NR beam measurement report MAC control element (CE) may be used to signal beam measurements between peer MAC entities. In another example, a set of MAC CEs may be used to configure and control the disclosed NR Beam Management procedures.

In addition, disclosed is a suite of exemplary beam management procedures. An NR Beam Training Procedure may be used to discover and measure beams transmitted by the UE or Network (NW) nodes. An NR Beam Alignment Procedure may be used to refine the alignment of a beam, which may include adjustments to the beam width, beam direction, etc. An NR Beam Tracking Procedure may be used to maintain the alignment of beams used for communication between a UE and NW node. An NR Beam Configuration Procedure may be used to configure or reconfigure the set of serving beam(s) used for communication between a UE and NW node.

Furthermore, disclosed herein is a suite of NR Connection Control procedures. An NR Initial Access Procedure may be used to perform initial access in NR beam centric networks. An NR Mobility Management Procedure may be used to perform mobility management in NR beam centric networks.

New Radio (NR) Access Technology may be used to meet a broad range of use cases including enhanced mobile broadband, massive MTC, and critical MTC, among other things. The NR may consider frequencies of 100 GHz. To compensate for the increased path loss in High Frequency NR systems (HF-NR), beamforming may be used. High gain beams may be used to provide comprehensive coverage in a cell. The narrow beamwidths make the beams more susceptible to blockage that may result not only from mobility, but also from changes in the orientation of the UE or changes in the local environment. Mechanisms like the RRC handover procedure that are used to manage mobility in LTE networks require a lot of signaling overhead and incur undesired latency in handling fast beam switching. Therefore, there is a need for a layer 2 (L2) based mechanism that may be used to perform beam management in wireless networks, such as NR networks.

Figure 6:
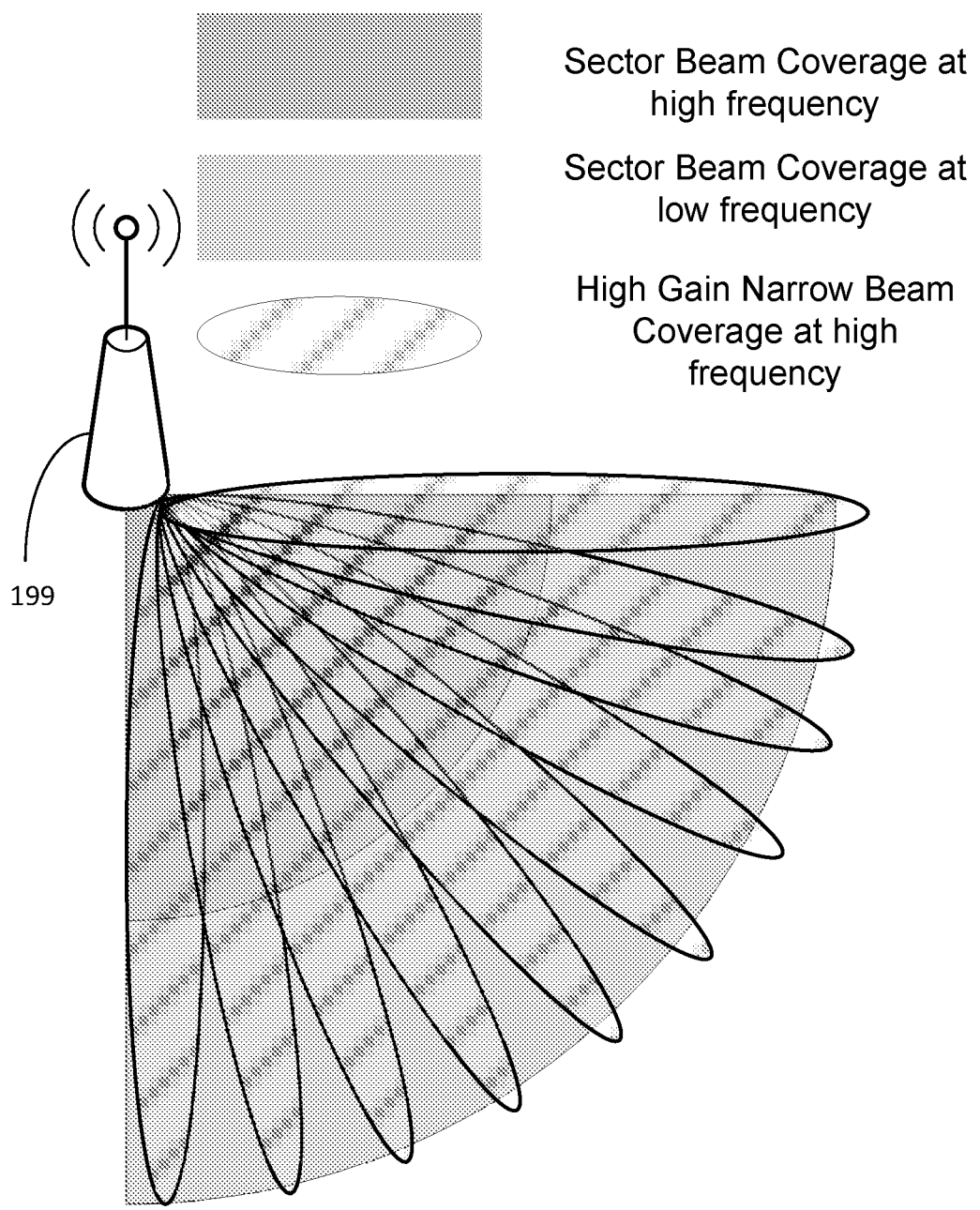
FIG. 6 illustrates an exemplary Cell Coverage with Sector Beams and Multiple High Gain Narrow Beams.

Beam Forming Impacts—There are effects of higher frequencies on coverage and the compensation of path loss by using multiple narrow beams for downlink common channels. This is illustrated in FIG. 6. In lower frequency bands (e.g., current LTE bands<6 GHz) the required cell coverage may be provided by forming a wide sector beam for transmitting downlink common channels. However, utilizing wide sector beam on higher frequencies (e.g., >>6 GHz) the cell coverage is reduced with same antenna gain. Thus, in order to provide required cell coverage on higher frequency bands, higher antenna gain is needed to compensate the increased path loss. To increase the antenna gain over a wide sector beam, larger antenna arrays (number of antenna elements ranging from tens to hundreds) are used to form high gain beams.

As a consequence the high gain beams are narrow compared to a wide sector beam so multiple beams for transmitting downlink common channels are needed to cover the required cell area. The number of concurrent high gain beams that access point is able to form may be limited by the cost and complexity of the utilized transceiver architecture. In practice, on higher frequencies, the number of concurrent high gain beams is much less than the total number of beams required for covering the cell area. In other words, the access point is able to cover only part of the cell area by using a subset of beams at any given time.

Figure 7:
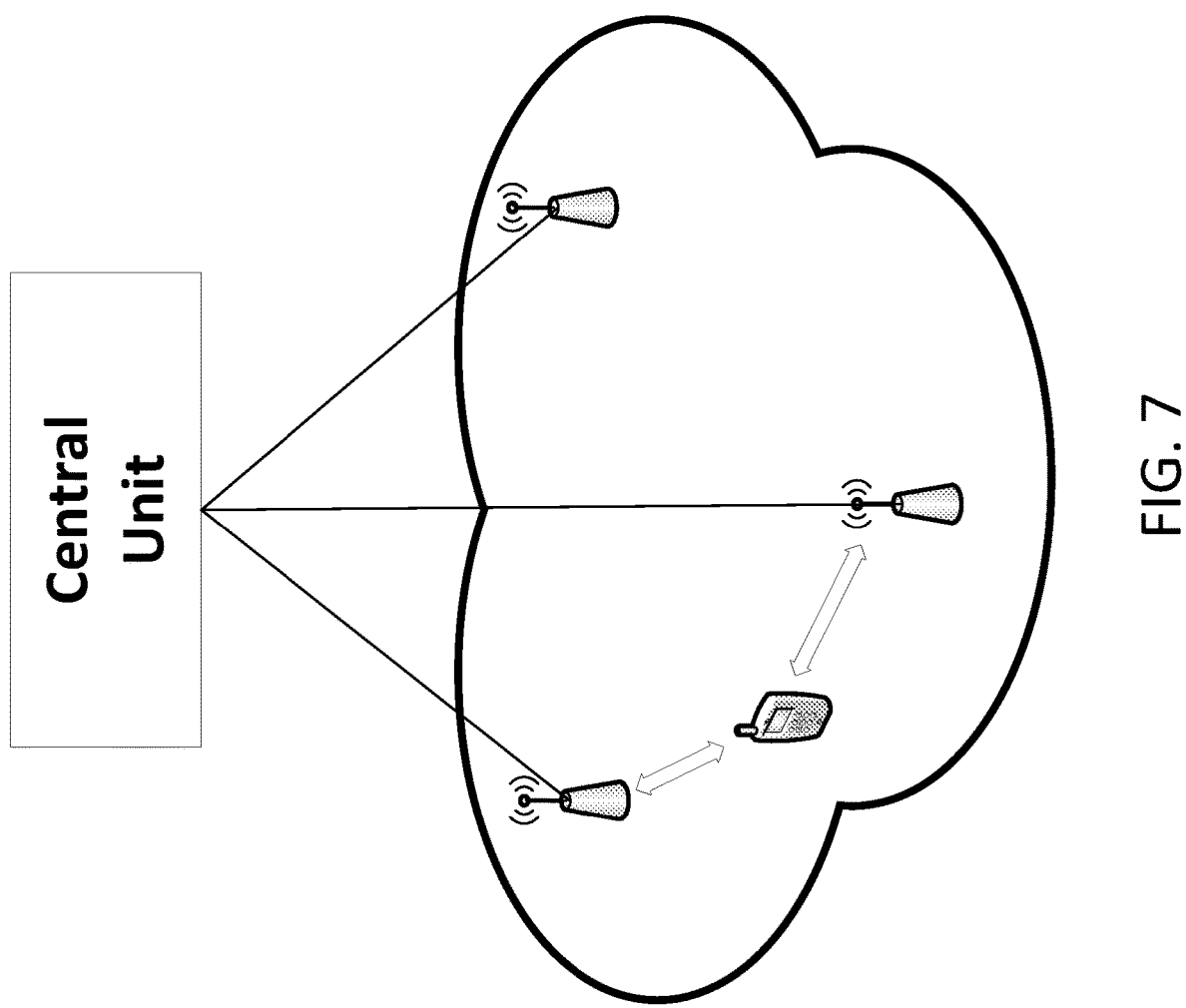
FIG. 7 illustrates an exemplary Virtual Cell.

Virtual Cell—A virtual cell may be defined as multiple TRPs (Transmission Reception Points) with a same cell ID under the control of a central unit, as shown in FIG. 7. Common information or cell-level information is transmitted in a large cell area and dedicated data is transmitted from adjacent TRPs near the UE with realization of CP/UP split.

IMT for 2020 and beyond is envisaged to expand and support diverse families of usage scenarios and applications that will continue beyond the current IMT. See ITU-R M.2083-0, IMT Vision—"Framework and overall objectives of the future development of IMT for 2020 and beyond." Furthermore, a broad variety of capabilities would be tightly coupled with these intended different usage scenarios and applications for IMT for 2020 and beyond.

The families of usage scenarios for IMT for 2020 and beyond include:

eMBB (enhanced Mobile Broadband)
  Macro and small cells
  1 ms Latency (air interface)
  Spectrum allocated at WRC-15 may lead up to 8 Gbps of additional throughput
  Support for high mobility
URLLC (Ultra-Reliable and Low Latency Communications)
  Low to medium data rates (50 kbps~10 Mbps)
  <1 ms air interface latency
  99.999% reliability and availability
  Low connection establishment latency
  0-500 km/h mobility
mMTC (massive Machine Type Communications)
  Low data rate (1~100 kbps)
  High density of devices (up to 200,000/km2)
  Latency: seconds to hours
  Low power: up to 15 years battery autonomy
  Asynchronous access
  Network Operation
  Network Operation addresses the subjects such as Network Slicing, Routing, Migration and Interworking, Energy Saving, etc.

NextGen Network Requirements

3GPP TR 38.913 Study on Scenarios and Requirements for Next Generation Access Technologies; (Release 14), V0.3.0 defines scenarios and requirements for next generation access technologies. The Key Performance Indicators (KPIs) for eMBB, URLLC and mMTC devices are summarized in Table 3.

TABLE 3

KPIs for eMBB, URLLC and mMTC Devices

| Device | KPI | Description | Requirement |
|---|---|---|---|
| eMBB | Peak data rate | Peak data rate is the highest theoretical data rate which is the received data bits assuming error-free conditions assignable to a single mobile station, when all assignable radio resources for the corresponding link direction are utilized (i.e., excluding radio resources that are used for physical layer synchronization, reference signals or pilots, guard bands and guard times). | 20 Gbps for downlink and 10 Gbps for uplink |
| | Mobility interruption time | Mobility interruption time means the shortest time duration supported by the system during which a user terminal cannot exchange user plane packets with any base station during transitions. | 0 ms for intra-system mobility |
| | Data Plane Latency | For eMBB value, the evaluation needs to consider all typical delays associated with the transfer of the data packets in an efficient way (e.g. applicable procedural delay when resources are not pre-allocated, averaged HARQ retransmission delay, impacts of network architecture). | 4 ms for UL, and 4 ms for DL |
| URLLC | Control Plane Latency | Control plane latency refers to the time to move from a battery efficient state (e.g., IDLE) to start of continuous data transfer (e.g., ACTIVE). | 10 ms |

TABLE 3-continued

KPIs for eMBB, URLLC and mMTC Devices

| Device | KPI | Description | Requirement |
|---|---|---|---|
| | Data Plane Latency | For URLLC the target for user plane latency for UL and DL. Furthermore, if possible, the latency should also be low enough to support the use of the next generation access technologies as a wireless transport technology that can be used within the next generation access architecture. | 0.5 ms |
| | Reliability | Reliability can be evaluated by the success probability of transmitting X bytes[(1)] within 1 ms, which is the time it takes to deliver a small data packet from the radio protocol layer 2/3 SDU ingress point to the radio protocol layer 2/3 SDU point of the radio interface, at a certain channel quality (e.g., coverage-edge). NOTE1: Specific value for X is FFS. | $1\text{-}10^{-5}$ within 1 ms. |
| mMTC | Coverage | "Maximum coupling loss" (MCL) in uplink and downlink between device and Base Station site (antenna connector(s)) for a data rate of [X bps], where the data rate is observed at the egress/ingress point of the radio protocol stack in uplink and downlink. | 164 dB |
| | UE Battery Life | User Equipment (UE) battery life can be evaluated by the battery life of the UE without recharge. For mMTC, UE battery life in extreme coverage shall be based on the activity of mobile originated data transfer consisting of [200 bytes] Uplink (UL) per day followed by [20 bytes] Downlink (DL) from Maximum Coupling Loss (MCL) of [tbd] dB, assuming a stored energy capacity of [5 Wh]. | 15 years |
| | Connection Density | Connection density refers to total number of devices fulfilling specific Quality of Service (QoS) per unit area (per km²). QoS definition should take into account the amount of data or access request generated within a time t_gen that can be sent or received within a given time, t_sendrx, with x % probability. | $10^6$ devices/km² |

Figure 8:
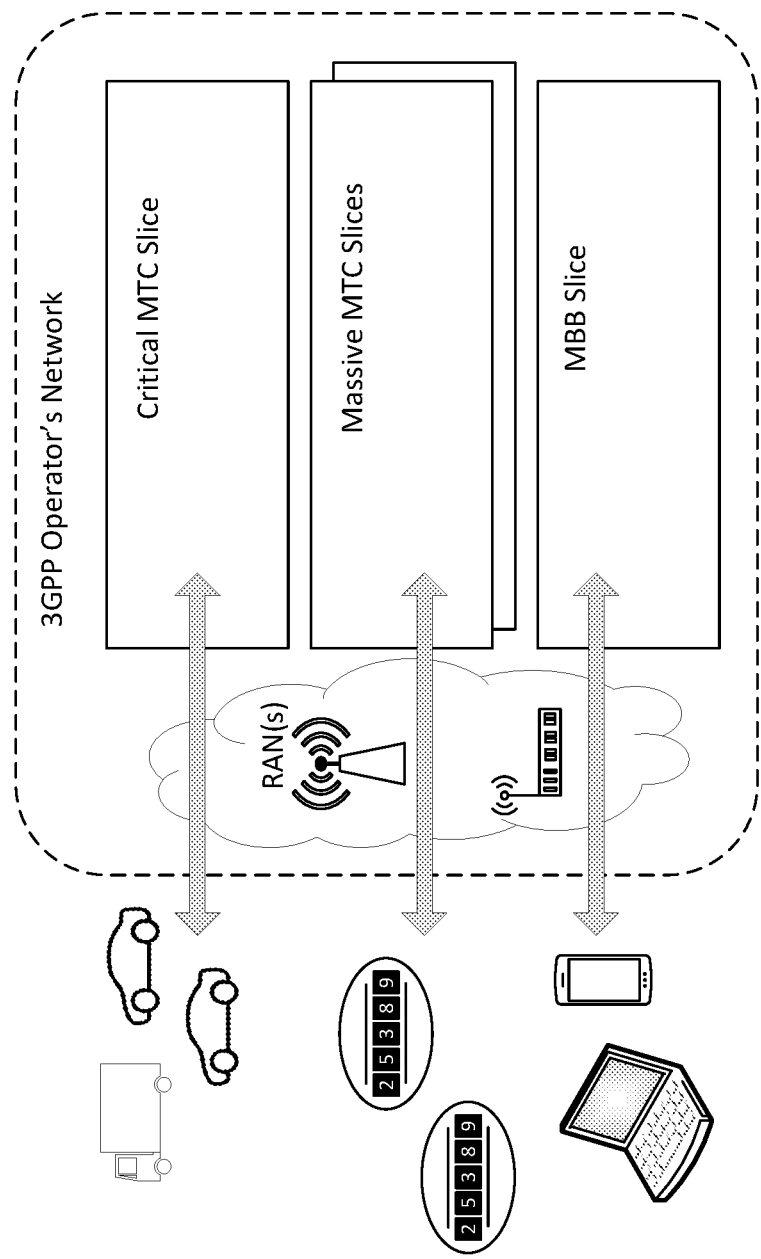
FIG. 8 illustrates an exemplary Network Slicing Concept.

Network Slicing—FIG. 8 provides a high level illustration of the network slicing concept. A network slice is composed of a collection of logical network functions that supports the communication service requirements of particular use case(s). It shall be possible to direct terminals to selected slices in a way that fulfil operator or user needs, e.g. based on subscription or terminal type. The network slicing primarily targets a partition of the core network, but it is not excluded that Radio Access Network (RAN) may need specific functionality to support multiple slices or even partitioning of resources for different network slices. See 3GPP TR 22.891, Feasibility Study on New Services and Markets Technology Enablers (SMARTER); Stage 1 (Release 14), V1.3.2.

Figure 9:
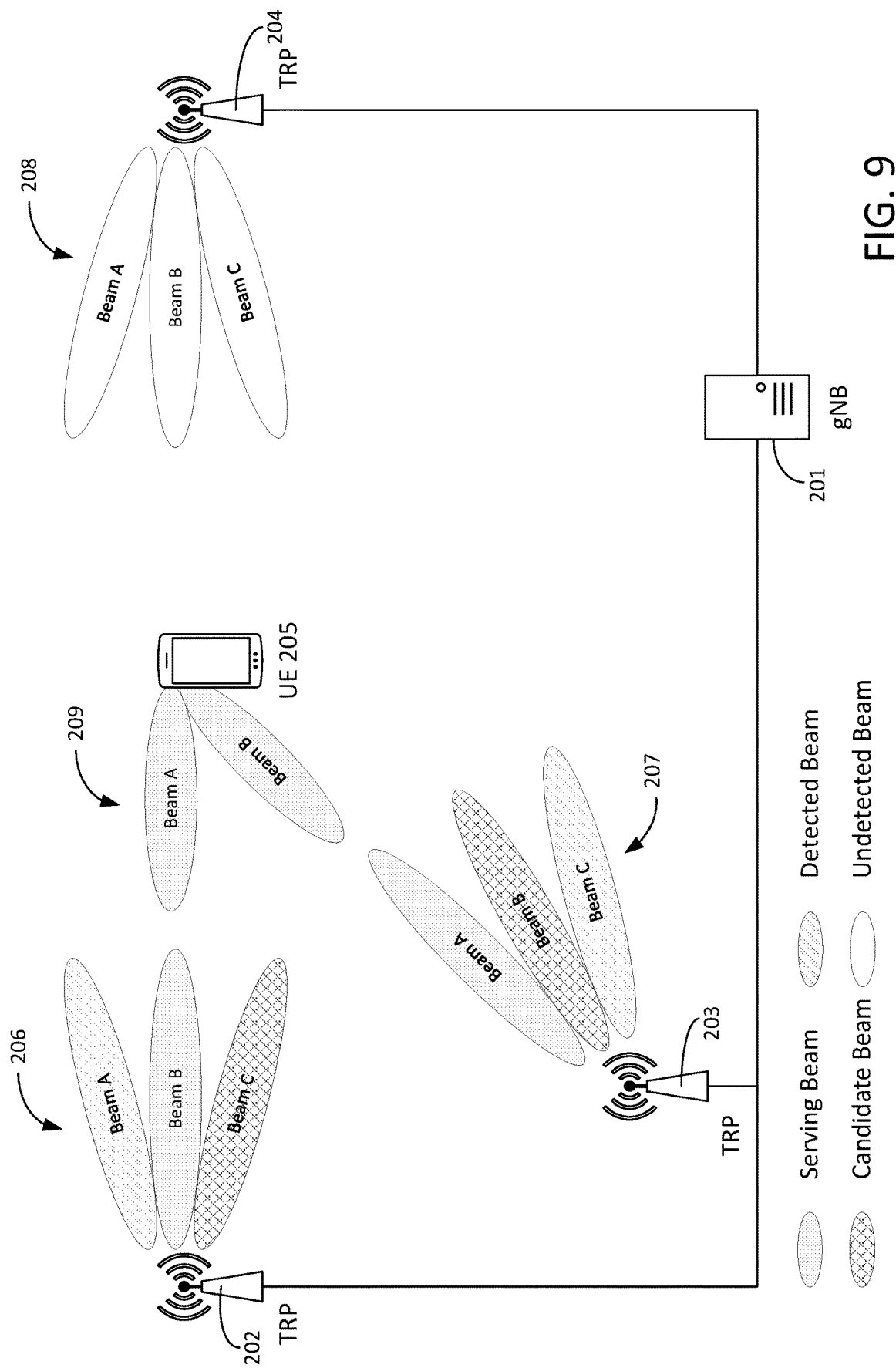
FIG. 9 illustrates an exemplary NR Virtual Cell.

An exemplary NR deployment scenario is shown in FIG. 9. In this deployment, gNB 201 controls multiple Transmission and Reception Points (TRPs). The TRPs under control of gNB 201 form a virtual cell. TRPs (e.g., TRP 202, TRP 203, TRP 204) may provide coverage using multiple beams. The radiation patterns of the beams from one or more TRPs may overlap to provide full coverage of the virtual cell area. UE 205 may support transmission and reception using multiple beams. UE 205 may also support inter-TRP transmission/reception, where the beams used for communication with gNB 201 are from different TRPs within the virtual cell.

Beams 209 (e.g., Beam A or Beam B of UE 205), beams 206 (e.g., Beam A, Beam B, or Beam C of TRP 202), beams 207 (e.g., Beam A, Beam B, or Beam C of TRP 203), or beams 208 (e.g., Beam A, Beam B, or Beam C of TRP 204) that are used for communication may vary as UE 205 moves within the coverage area of the virtual cell. For high frequency scenarios, e.g. mmW, beams 206, 207, 208, or 209 that may be used may also be impacted by changes in the local environment; e.g. people/objects moving, changes in the orientation of the UE, etc.

To support beam level mobility in NR networks, the NR beam management procedures may distinguish types of beams, such as serving beam, candidate beam, or detected beam. A serving beam may be a beam used for communication between UE 209 and TRP/gNB (e.g., TRP 202/gNB 201). Determination of the serving beam(s) may be based on UE 209 and network measurements. In addition, other inputs such as TRP load, traffic distribution, transport and hardware resources and operator defined policies may be taken into account. UE 205 may monitor a serving beam for scheduling assignments/grants, may perform measurements to ensure the beam continues to meet the serving beam criteria, or may report measurements to ensure the beam continues to meet the serving beam criteria, among other things. The serving beam criteria serving beam criteria may be defined as a measurement quantity; e.g. RSRP, RSRQ, RSSI or SINR, being above a configured threshold.

A candidate beam may be a beam that may be used as a communication beam (e.g., meets the serving beam criteria), but has not been configured as a serving beam. UE 205 performs and may report measurements for a candidate beam, but does not monitor the beam for scheduling assignments/grants.

A detected beam may be a beam that has been measured by UE 205, but does not meet the serving beam criteria. UE 205 may perform and may report measurements for a detected beam, but does not monitor the beam for scheduling assignments or grants.

In the example shown in FIG. 9, the serving beams are Beam B of TRP 202 (i.e., beam B of beams 206), which is paired with Beam A of UE 205 (i.e., beam A of beams 209), and Beam A of TRP 203 (i.e., beam A of beams 207), which is paired with beam B of UE 205 (i.e., beam B of beams 209). The candidate beams are Beam C of TRP 202 and Beam B of TRP 203; and the detected beams are Beam A of TRP 202 and Beam C of TRP 203.

Figure 10:
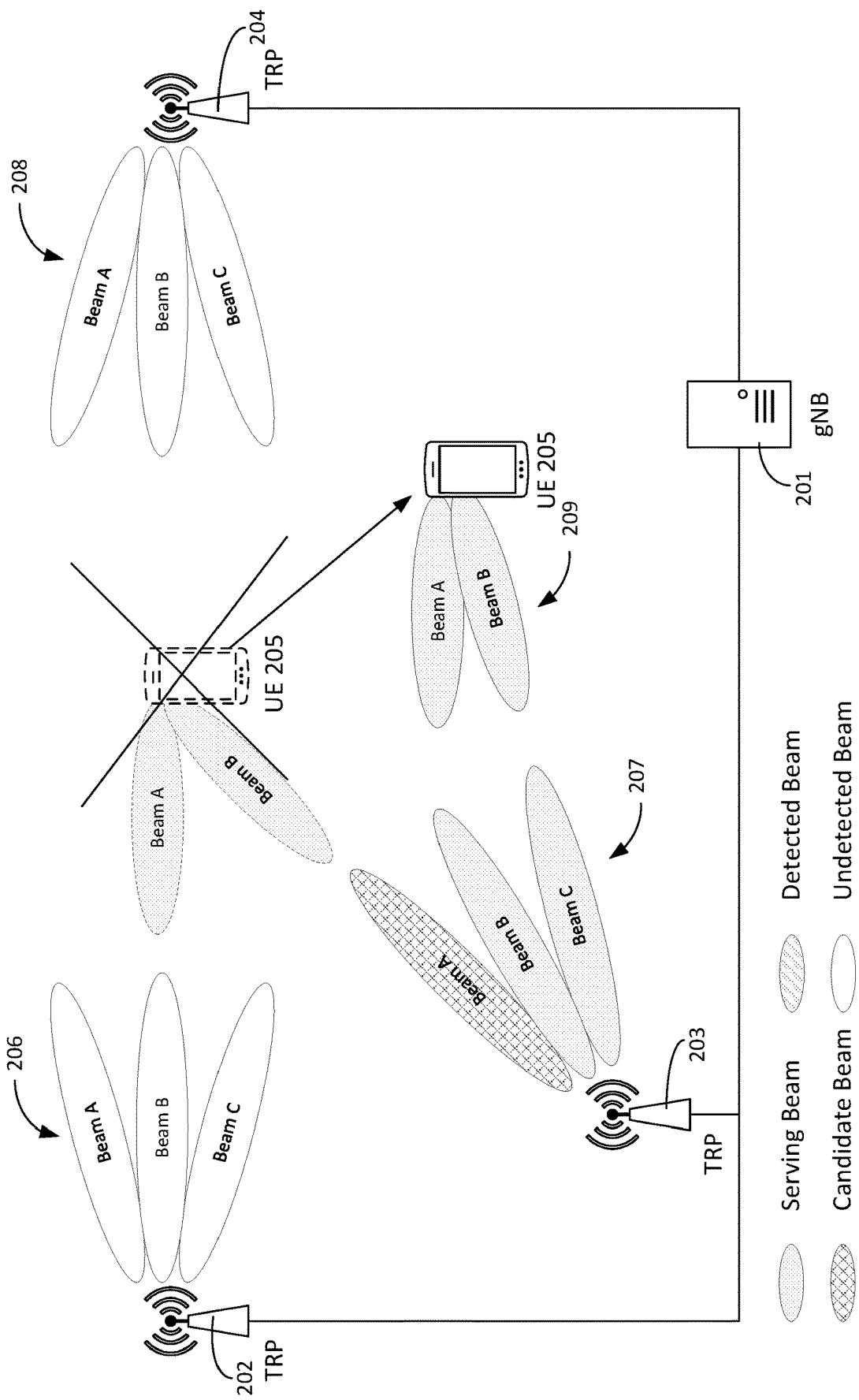
FIG. 10 illustrates an exemplary UE Mobility in NR Virtual Cell.

After UE 205 moves as shown in FIG. 10, the serving beams are Beam B of TRP 203, which is paired with Beam A of UE 205, and Beam C of TRP 203, which is paired with beam B of UE 205. The candidate beam is Beam A of TRP 203. There aren't any detected beams in this scenario.

Figure 1:
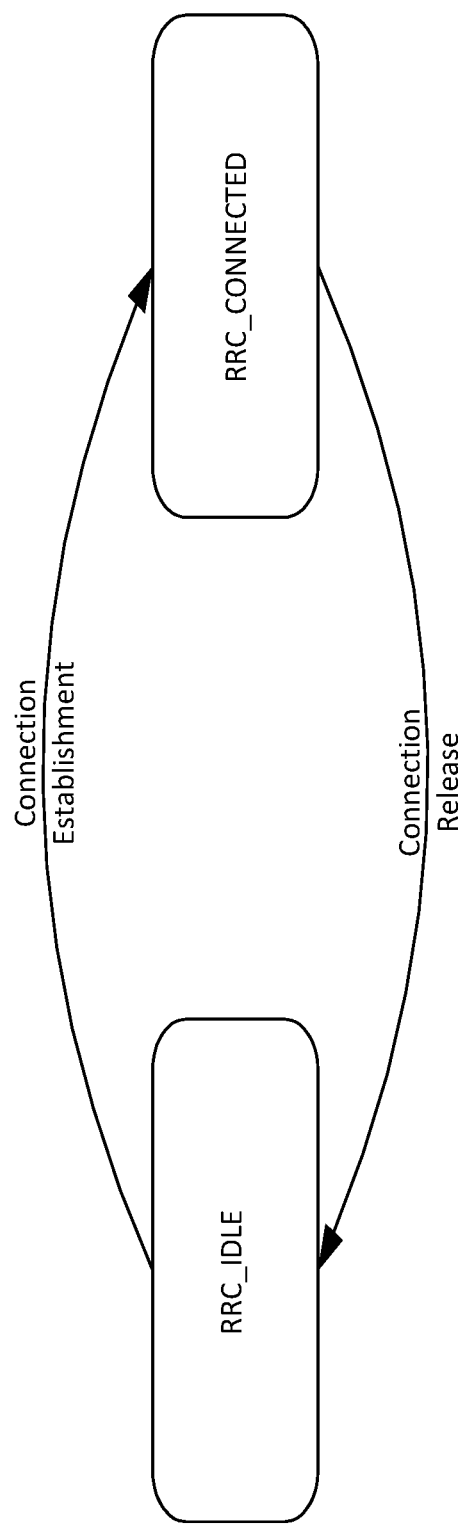
FIG. 1 illustrates an exemplary RRC Protocol State Machine.
Figure 2:
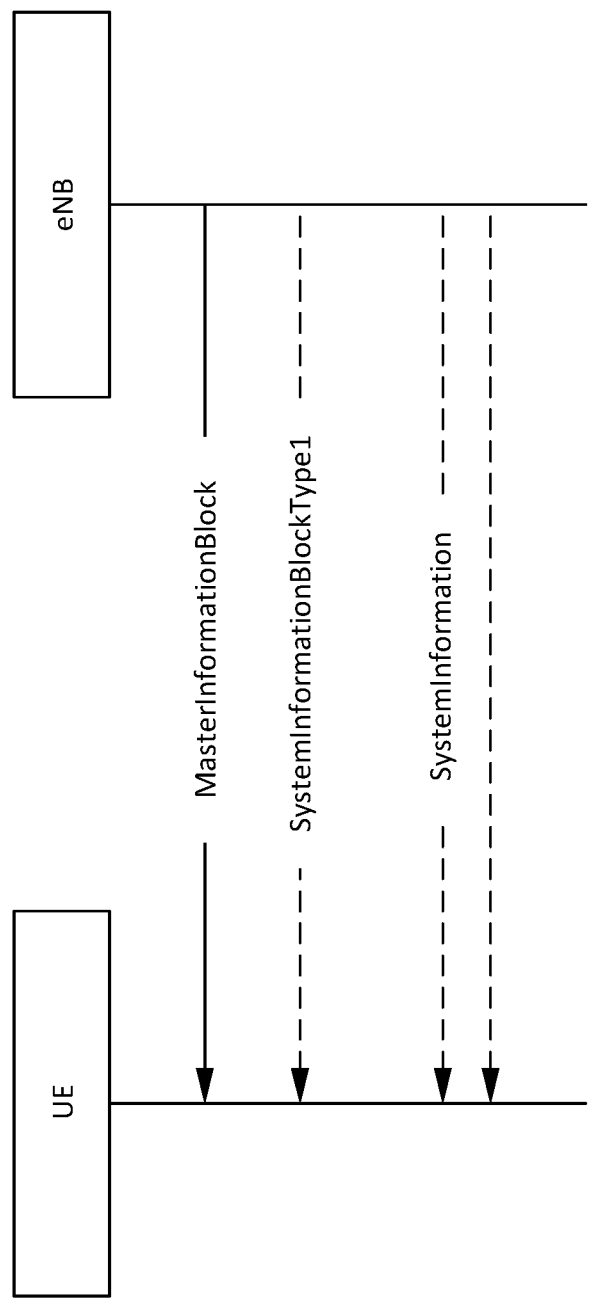
FIG. 2 illustrates an exemplary System Information Acquisition Procedure.
Figure 3:
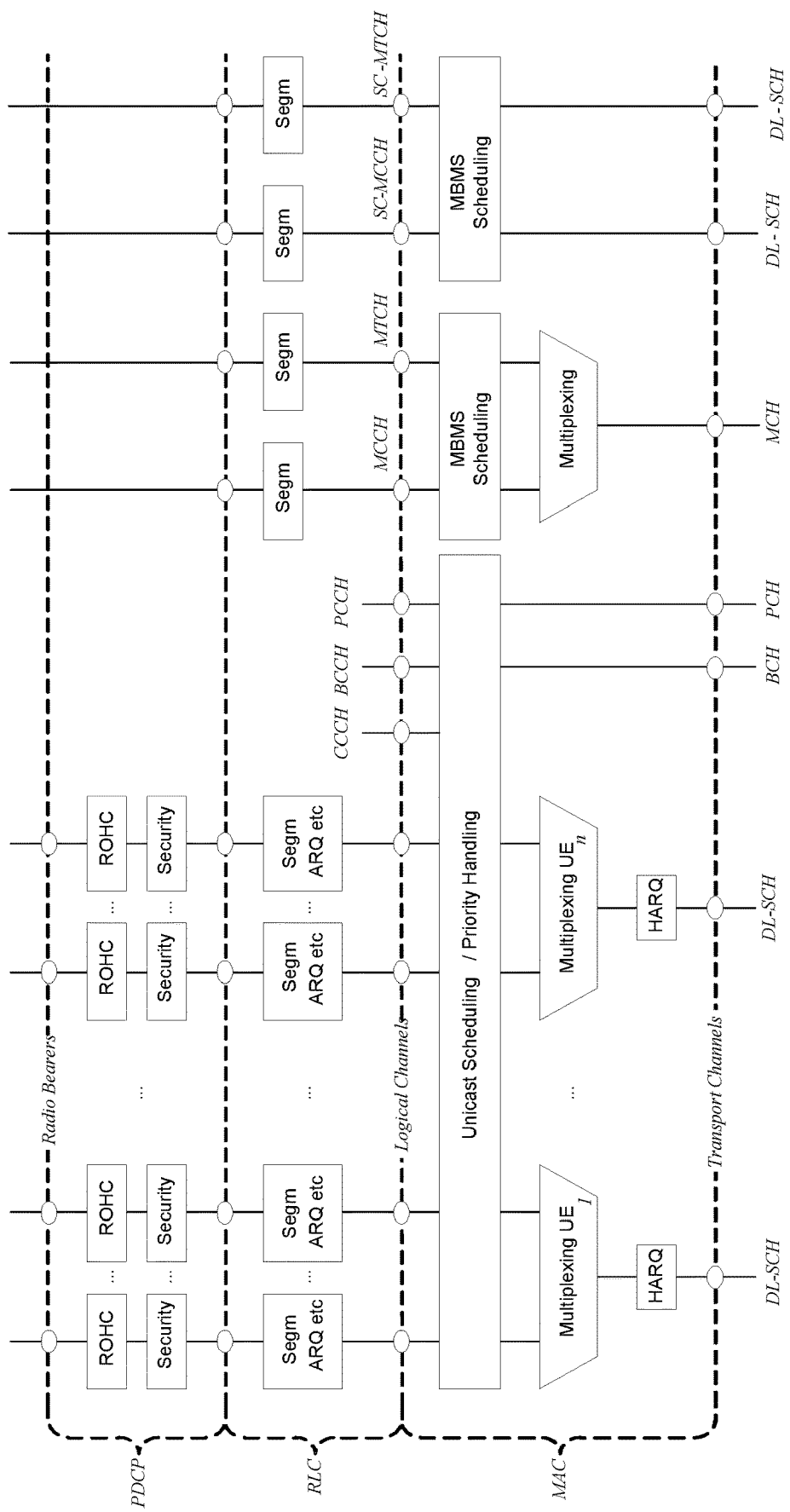
FIG. 3 illustrates an exemplary Layer 2 Structure for DL.
Figure 4:
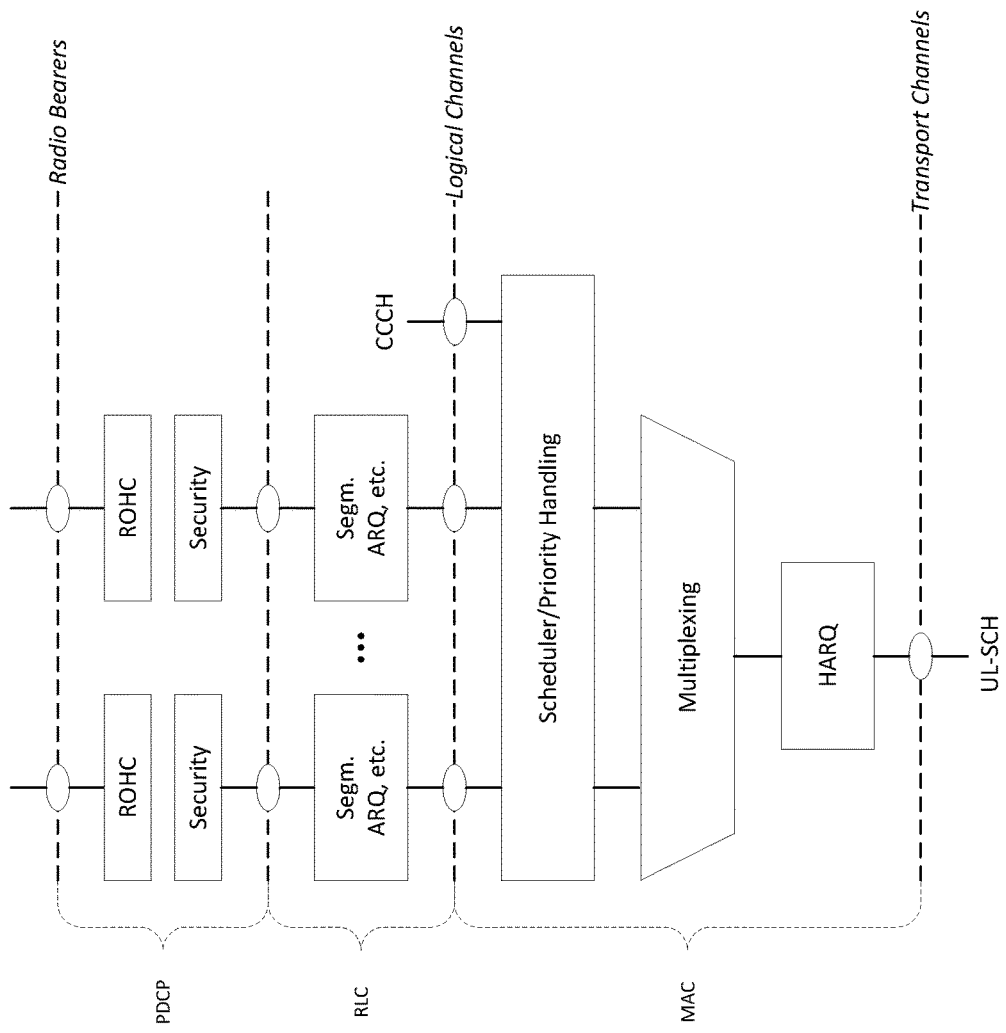
FIG. 4 illustrates an exemplary Layer 2 Structure for UL.
Figure 5:
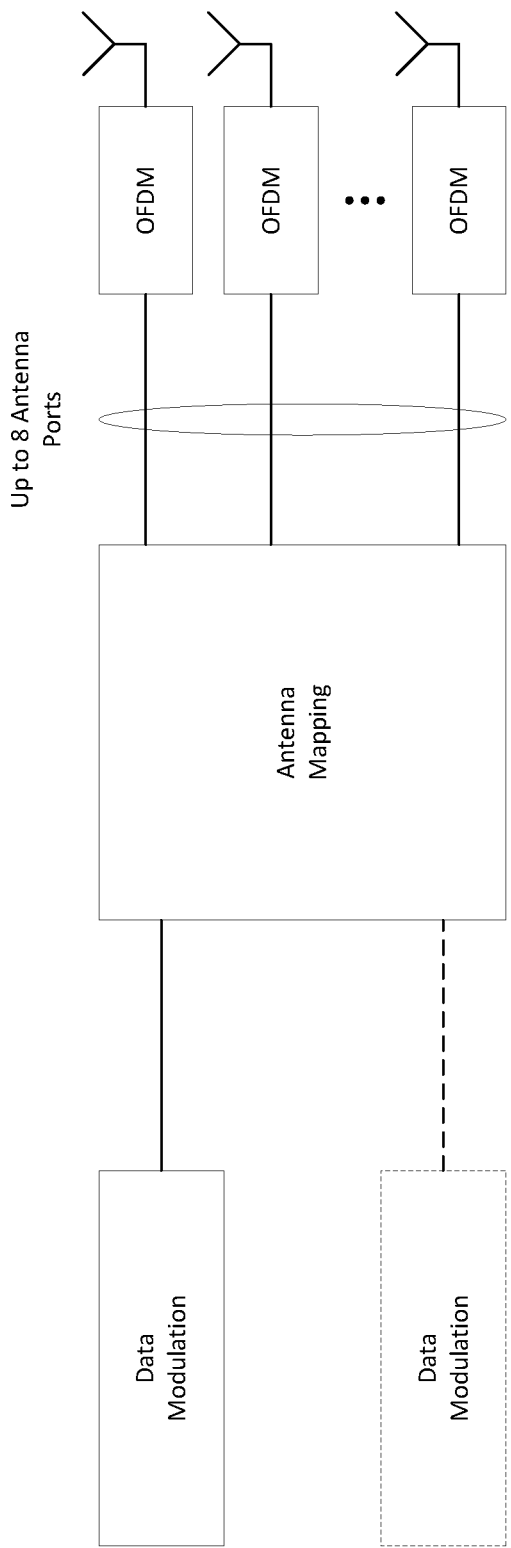
FIG. 5 illustrates an exemplary Structure for LTE DL Multi-Antenna Transmission.
Figure 11:
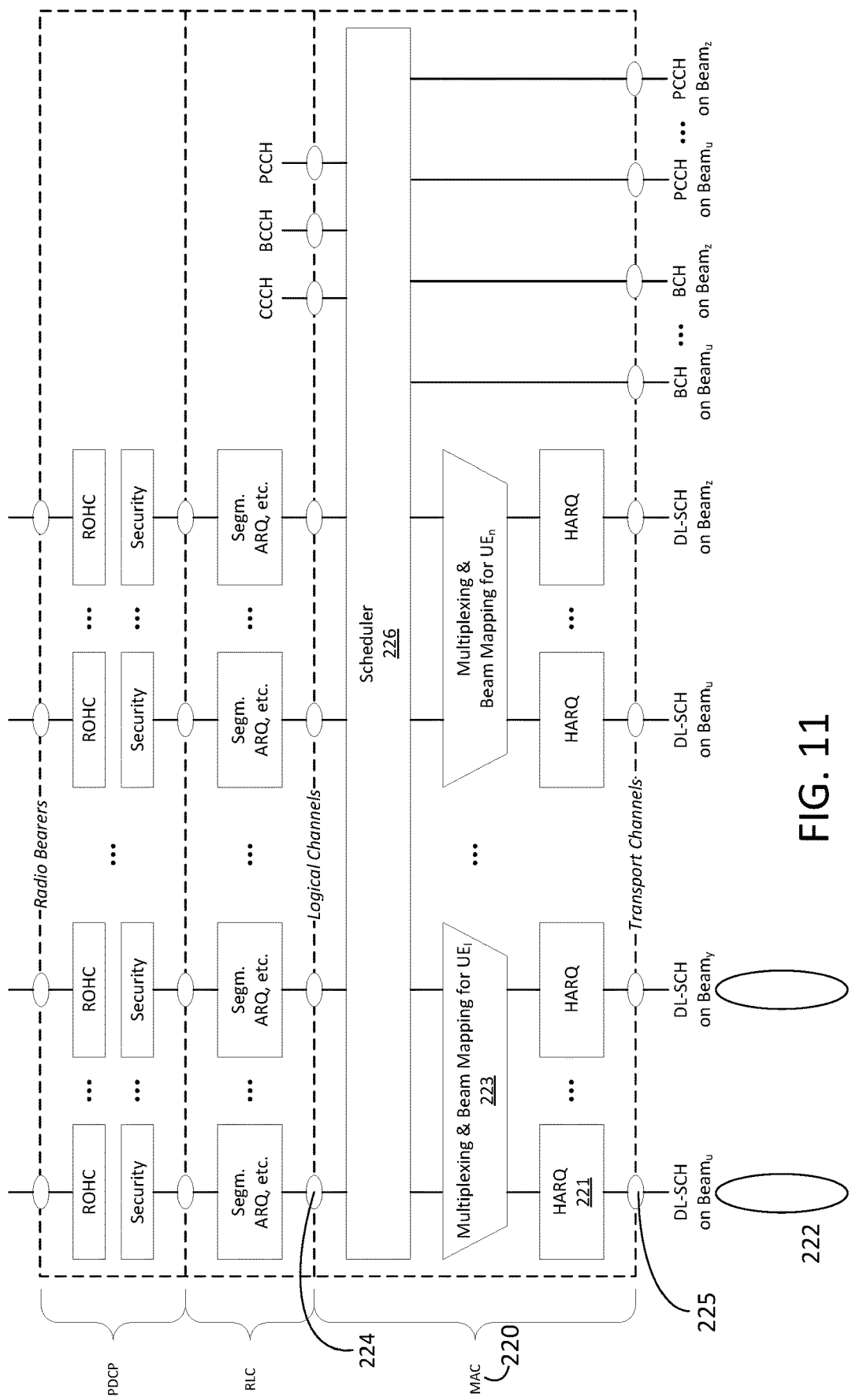
FIG. 11 illustrates an exemplary NR Layer 2 Structure for DL Beam Aggregation.
Figure 12:
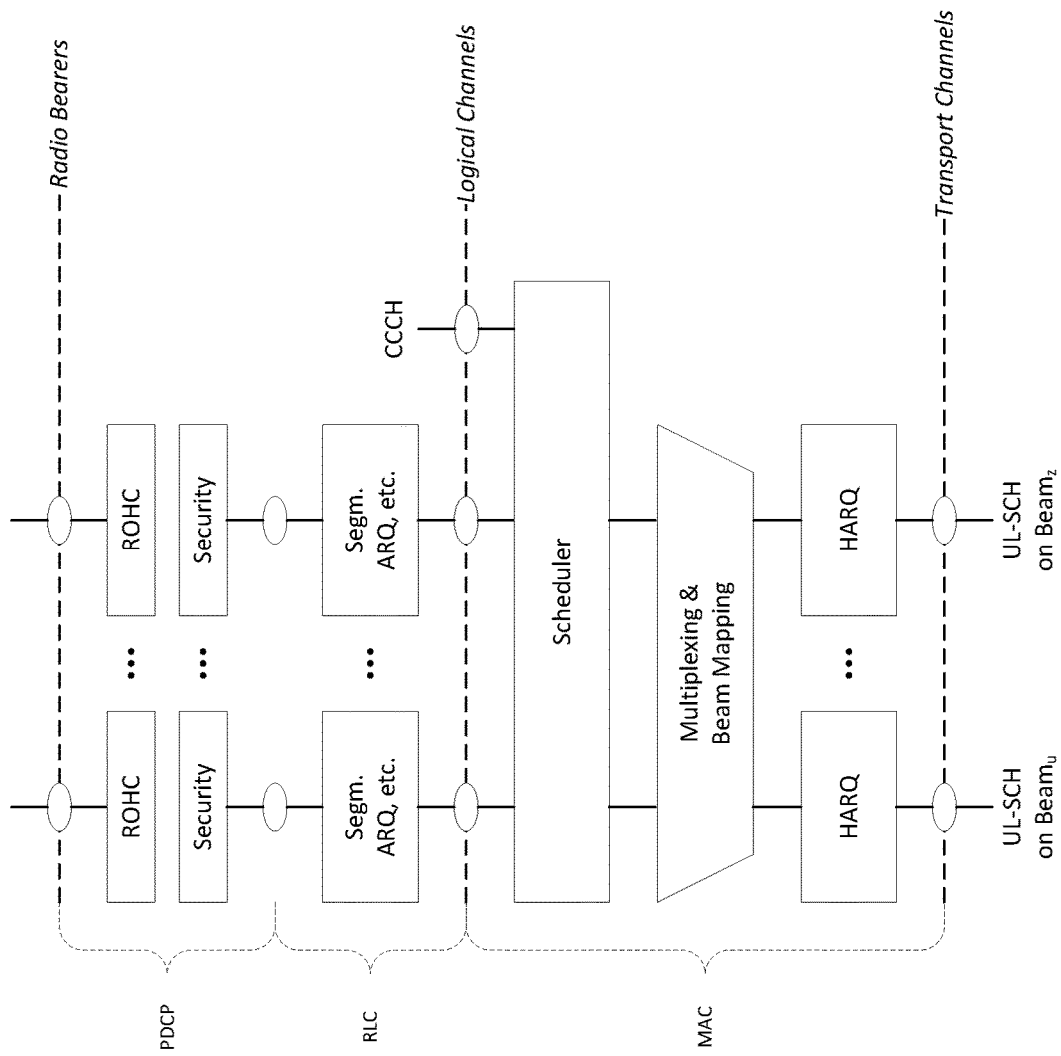
FIG. 12 illustrates an exemplary NR Layer 2 Structure for UL Beam Aggregation.

NR Layer 2 Structure is discussed below. To facilitate beam management at the MAC sublayer, the multi-beam nature of the physical layer is exposed to the MAC sublayer. FIG. 11 illustrates an exemplary NR Layer 2 Structure for DL Beam Aggregation. In one example, one HARQ entity (e.g., HARQ 221) is required per beam (e.g., beam 222) and the mapping of logical channels onto a beam is performed by the MAC sublayer (e.g., MAC sublayer 220). This may be referred to as beam aggregation. The NR L2 structure for DL and UL beam aggregation is shown in FIG. 11 and FIG. 12 respectively. It should be noted that conventional systems, such as the apparatus FIG. 3 or FIG. 4, do not consider the concept of a beam, as disclosed herein. For example, in FIG. 11-FIG. 14, the multi-beam nature of the physical layer for NR is exposed to MAC sublayer 220. Making the beams visible to the MAC 220 enables beam level aggregation. This also allows the beams to be scheduled independently by the MAC scheduler 226.

The MAC sublayer performs the mapping between logical channels (e.g., logical channel 224) and transport channels (e.g., transport channel 225—DL-SCH). In the disclosed NR L2 structure, MAC sublayer 220 also performs the mapping to the serving beam(s). In the case where transmission on a single serving beam is scheduled, a single transport block is generated and mapped to the Downlink Shared Channel (DL-SCH) on the scheduled serving beam. In cases where two or more serving beams are scheduled, MAC sublayer 220 generates multiple transport blocks, one for each scheduled serving beam. When generating the transport block for a given DL-SCH/beam, MAC entity 220 may multiplex radio link control protocol data units (RLC PDUs) from one or more logical channels (e.g., logical channel 224). Multiplexing and beam mapping may be done by block 223. For FIG. 11 (and FIG. 12-FIG. 14), the different parallelograms for multiplexing and beam mapping may correspond to the multiplexing and beam mapping for different UEs. There may be more than one UE scheduled on a given beam, so that is why Beam$_u$, for example, may be shown multiple times.

As discussed herein, the multi-beam nature of the physical layer may be exposed to the multiplexing function, thereby allowing the mapping of a logical channel to a specific beam. How the mapping is performed may be based on information, such as UE measurements and network measurements. In addition, other information, such as TRP load, traffic distribution, transport and hardware resources, or Operator defined policies may be taken into account.

For example, consider the scenario where TRP 199 provides coverage with wide sector beams and multiple high gain narrow beams as shown in FIG. 6. When a UE is within the coverage area of the wide sector beam, it may be advantageous to map RLC PDUs for logical channels requiring high reliability/low latency; e.g. control signaling, to the sector beam, since transmissions via the sector beam may be less susceptible to blockage due to the wider beam width. Alternatively, when the UE is near the cell edge and being covered by multiple high gain narrow beams, it may be advantageous to map RLC PDUs that require high reliability/low latency to the "best beam", where determination of the "best beam" may be based on the NR feedback for beam management described herein (e.g., NR-RSRP). The "best beam" may be considered the beam with the highest RSRP (e.g., NR-RSRP).

Figure 13:
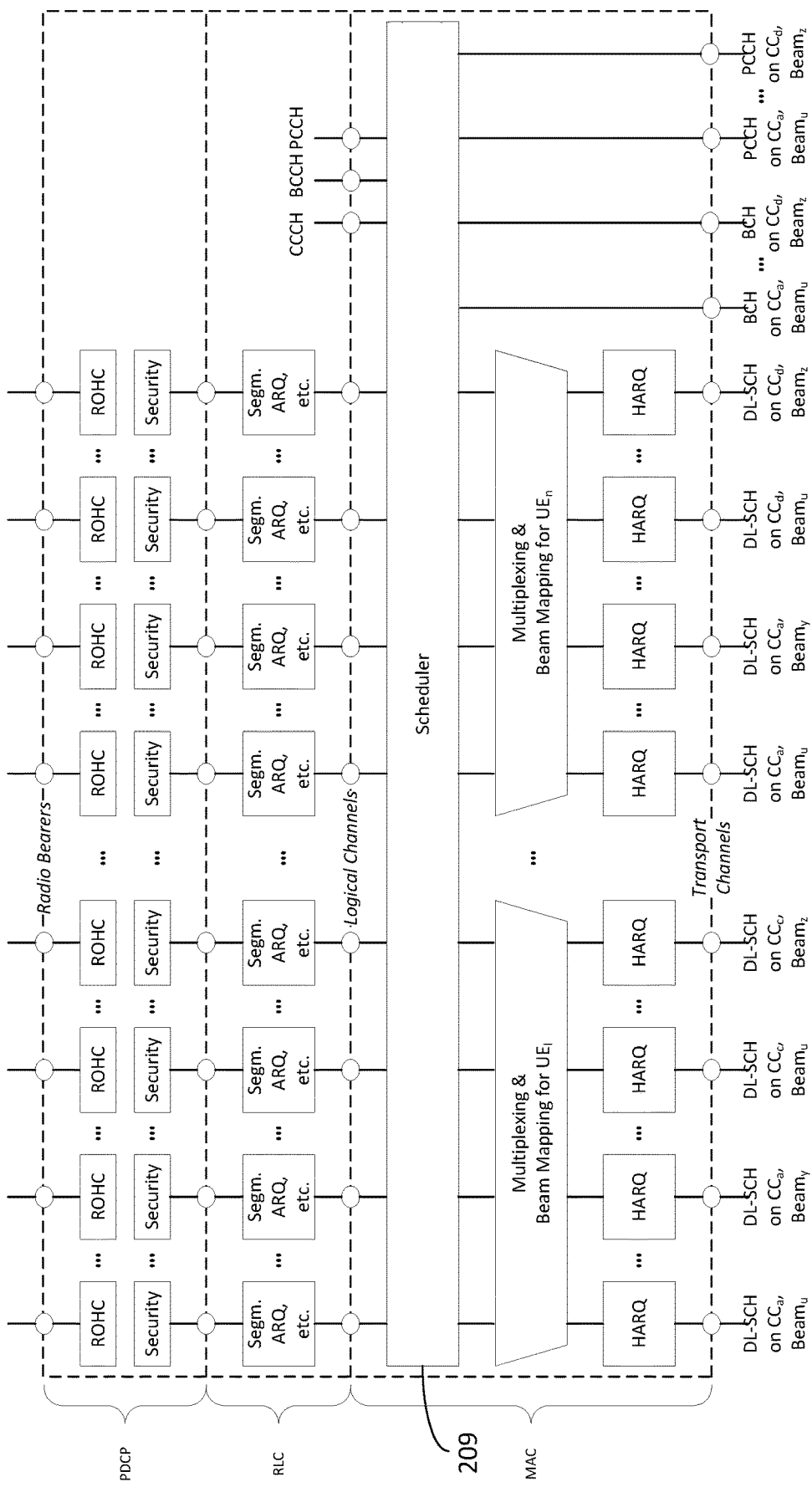
FIG. 13 illustrates an exemplary NR Layer 2 Structure for DL Beam Aggregation with Carrier Aggregation Configured.
Figure 14:
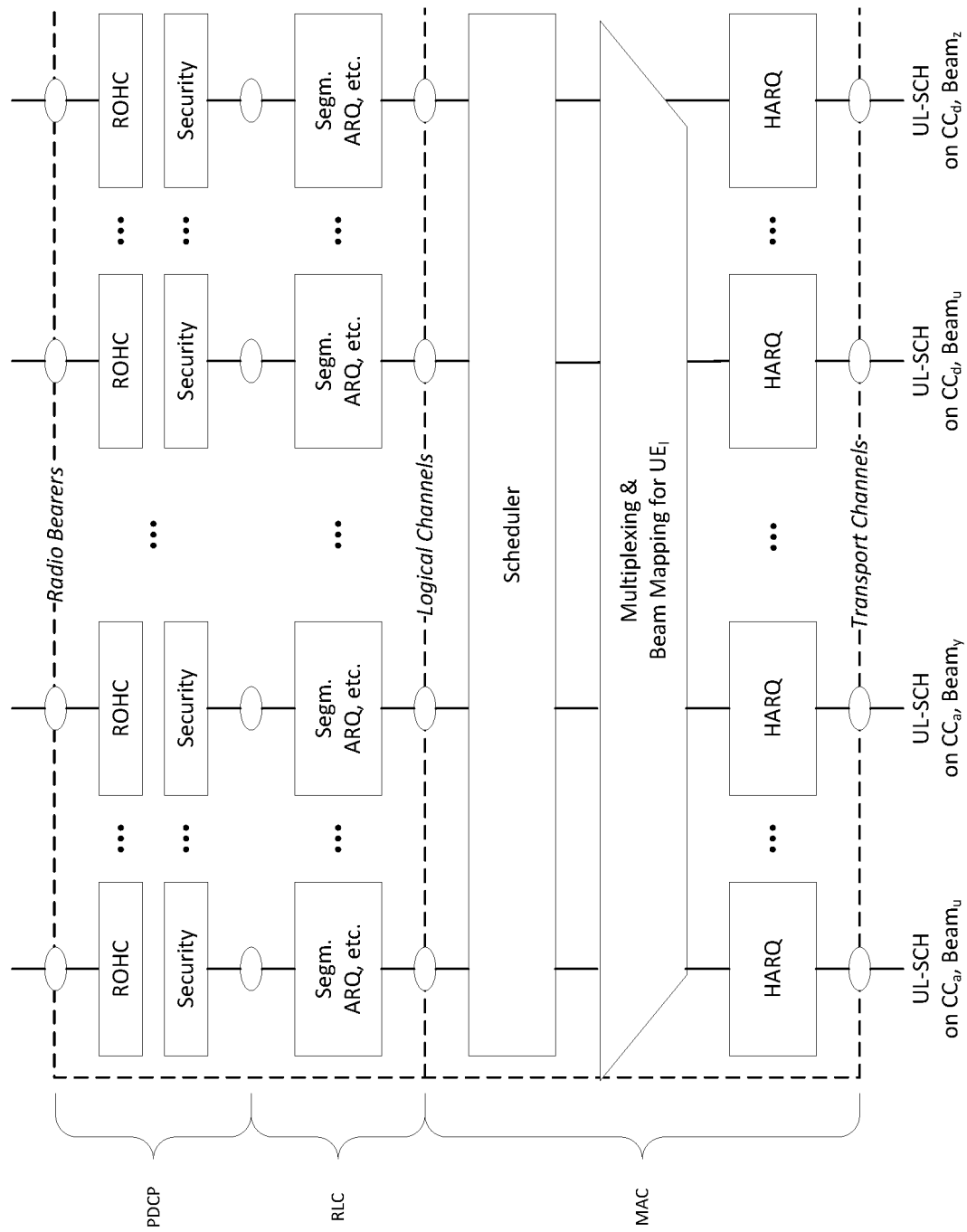
FIG. 14 illustrates an exemplary NR Layer 2 Structure for UL Beam Aggregation with Carrier Aggregation Configured.

With reference to FIG. 13 and FIG. 14, the multi-beam architecture nature of the physical layer is exposed to the MAC layer for which one HARQ entity is required per pair of beam and component carrier (beam i, CC j) where the coverage area that corresponds to the group of serving cells is modeled as n beams and m CCs.

The scheduler (e.g., in the network—scheduler 241) of the group of serving cells (carrier aggregation model) performs scheduling across pairs of component carriers and beams [(beam1, CC1), . . . (beam i, CCj), (beam n, CCm) that corresponds to the coverage area of the group of serving cells modeled as n beams and m CCs. The scheduler may be centralized in a central unit (CU) or distributed between a central unit and distributed unit (DU). Mapping between CU/DUs and gNB/TRPs may be implementation or deployment specific. For a given deployment, the scheduler will be centralized or distributed. Alternatively, by specification, gNB may correspond to CU and DU may correspond to a TRP or a subset of the set of TRPs within the CU. For example, gNB is centralized and the TRPs are distributed. The scheduler may be targeted to the gNB which is the CU or the TRPs which are the DUs.

NR transmission modes may be defined and specified in association with beam centric architecture. UE 205 may be configured statically or semi statically (e.g., RRC signaling) with a transmission mode by the NW node (e.g., gNB 201 or TRP 202), for e.g. in accordance with capability exchange of UE 205 with the NW node. For each transmission time interval (TTI), the physical layer of UE 205 may determine the choice of the transmission parameters allowed by the configured transmission mode. This determination may be transparent to the MAC layer. For example, UE 205 may perform measurements and report them to NW node 190. The measurements report may include a precoder matrix indicator and a rank indicator which may be used by NW node 190 (e.g., the gNB) to determine the transmission mode. The different transmission modes correspond to the use of different multi-antenna transmission schemes, which are used to accomplish what is referred to as multi-layer transmission. Whether to use one layer over another layer for a transmission may be dependent on the channel conditions or the throughput required by the service. For example, Transmission Mode 9, which supports up to 8 layers, may be used for high data rate services when channel conditions are very good, while Transmission Mode 2 (Transmit Diversity) may be used when a user is at the cell edge and channel conditions are poor.

In both uplink and downlink, there is one independent hybrid-ARQ entity per pair (beam i, CC j) and one transport block is generated per TTI per pair (beam i, CC j) in the absence of spatial multiplexing. Each transport block and its potential HARQ retransmissions are mapped to a single pair (beam i, CC j).

With reference to FIG. 14, in the UL, the MAC of UE 205 may perform logical channel prioritization and scheduling (possibly based on grant from gNB 201 in the case of non-grant-less transmission). The MAC of UE 205 multiplexer may perform logical channels multiplexing and distribute the multiplexed data across the HARQ entity associated with each pair (beam i, CC j) based on the grant received on each CC j in the case of non-grant-less transmission. UE 205 may autonomously make the decision in a case of UL grant-less transmission. In an example, for URLLC services, UE 205 may not be able to wait until a grant was received due to the latency requirements. UE 205 may choose a beam/CC based on metrics it may have like the BLER for past transmissions or possibly feedback from gNB 201.

NR feedback for beam management is disclosed herein. Feedback signaled between the peer MAC entities may be used to assist with beam management (e.g., beam selection, beam training, determination of the serving beam(s), etc). The feedback may be based on beam measurements performed by the physical layer, such as RSRP or RSRQ, where the measurement quantities NR-RSRP and NR-RSRQ are based on Beam Training Reference Signals (BT-RS). A node may measure and provide feedback for serving beam(s), candidate beam(s), or detected beam(s), where each beam may be defined by a Beam Index (e.g., beam Id). Beam Training Reference Signals are signals occupying specific time-frequency resources that are used to identify the beam and are used by the beam management procedures. The BT-RSs may be measured by the receiving node and decisions may be made based off the results of these measurements. A beam Id may be a construct that uniquely identifies the beam. It may be an explicit Id or an index that is used to "look up" the beam identity and associated characteristics (e.g. reference signal structure). The beam Id may be a numerical value that corresponds to the identity of the beam.

The feedback signaled between the MAC entities may be used to enable UE controlled or NW controlled beam management. In the case of UE controlled beam management, the MAC entity in UE 205 may make decisions about serving/candidate beams based on physical layer beam measurements and inform the peer MAC entity in gNB 201 (e.g., NW node) of these decisions. Alternatively, in the case of NW controlled beam management, UE 205 may report metrics based on physical layer beam measurements to the MAC entity in gNB 201. The MAC entity in the gNB 201 would then make decisions about serving/candidate beams and inform the peer MAC entity in UE 205 of these decisions. A hybrid approach where the decisions can be made at either node (e.g., NW node or UE node) is also possible.

Herein, mechanisms are defined for beam measurement reporting and beam management commands (e.g., beam measurement, beam training command, a beam alignment command, a beam tracking command, a beam addition command, or a beam release command) that are used to enable the NR beam management procedures.

NR beam measurement reporting is discussed below (e.g., Table 4, FIG. 20-FIG. 28). A measuring node (e.g., NW node or UE node) may be configured with a reporting configuration that includes one or more of the following: 1) reporting criterion or 2) reporting format. Reporting Criterion: Criterion that triggers the measuring node to send a report to the peer MAC entity, where the reports may be configured for periodical or event based reporting. Reporting Format: The quantities or metrics that are included in a report and associated information, such as the number of beams to report or type of beams to report (serving, candidate, or detected beams), among other things.

Events used to trigger reporting may be based on physical layer measurements, in/out-of-sync transitions, exceeding a specified block error rate (BLER) threshold, Radio Link Failure (RLF) detection, changes in the mobility state as specified in 3GPP TS 36.304, addition or removal of Radio Bearers (RBs), requests from the peer MAC entity, etc. An exemplary set of events that may be used to trigger beam measurement reporting is provided in Table 4. The events of Table 4 may also be used to trigger the transmission of other beam management commands. These events are beam based events. For LTE, the events were cell based. The triggering of these events helps to enable mobility management at the beam level.

TABLE 4

Exemplary Set of Events Used to Trigger NR Beam Measurement Reporting

| Event | Description |
| --- | --- |
| NR-D1 | The number of serving beams is greater than a threshold. |
| NR-D2 | The number of serving beams is less than a threshold. |
| NR-D3 | The number of candidate beams is greater than a threshold. |
| NR-D4 | The number of candidate beams is less than a threshold. |
| NR-D5 | One or more serving beams no longer meet the serving beam criteria. |
| NR-D6 | One or more candidate beams no longer meet the serving beam criteria. |
| NR-D7 | One or more detected beams meet the serving beam criteria. |
| NR-D8 | Candidate beam becomes offset better than a serving beam. |
| NR-D9 | Serving beam becomes worse than threshold 1 and candidate beam becomes better than threshold 2. |

With further reference to Table 4, in an example with regard to NR-D8, if the candidate beam has a larger offset (e.g., threshold offset) power (e.g., RSRP) than the serving beam, then an event may be triggered, such as releasing the serving beam and adding the candidate beam. In an example, with regard to NR-D9, if the serving beam becomes worse than a first threshold (e.g., threshold 1=−60 dbm) and candidate beam becomes better than a second threshold (e.g., threshold 2=−50 dbm) then an event may be triggered, such as releasing the serving beam and adding the candidate beam. The use of NR-D8 and NR-D9 may help reduce excessive occurrence of the events based on insignificant fluctuations.

Figure 15:
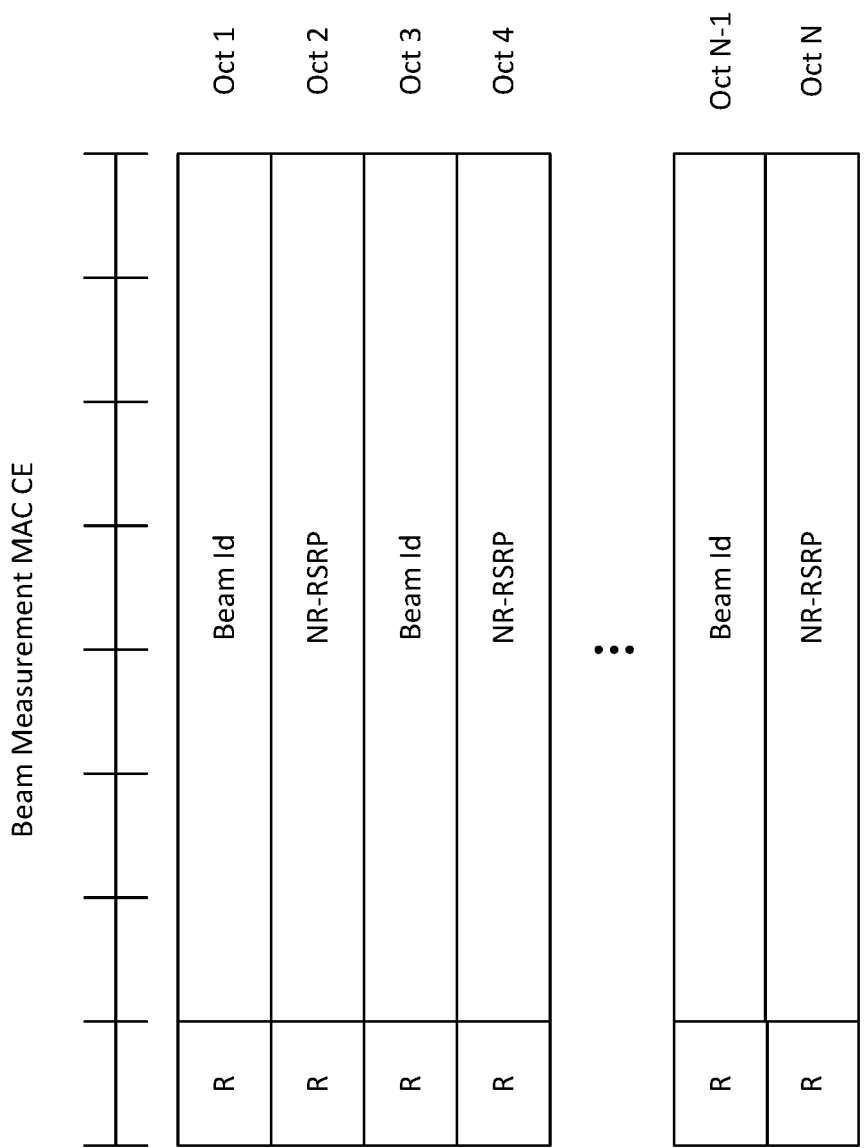
FIG. 15 illustrates an exemplary NR Beam Measurement Report MAC CE.

MAC control elements (CEs) may be used to signal the beam measurements between peer MAC entities or other instructions (e.g., NR Beam Training Command). An exemplary NR Beam Measurement Report MAC CE is shown in FIG. 15. The NR Beam Measurement Report MAC CE may be identified by a MAC protocol data unit (PDU) subheader with logical channel ID (LCID) as specified in Table 5 or Table 6, for example. There are no such formats defined for MAC CEs in LTE. These formats are part of the enabling details of the beam management disclosed herein.

The disclosed Beam Measurement MAC CE has a variable size, allowing it to include measurement reports for a specified maximum number of beams, defined as M. Alternatively, the MAC CE may be defined with a fixed size and padding may be used when the number of beams for which measurements are reported is less than M.

For each beam for which measurements are reported, the beam Id and corresponding measurement quantity e.g. NR-RSRP value, are included in the report. The report may be organized such that the beams are listed according to beam Id, NR-RSRP, or beam type (e.g., beams with lowest beam Id reported first, strongest beams reported first, serving beams reported first, etc.)

Which beams to include in the report may be dependent on the beam Id, the beam type, or the measurement result. For example, the measuring node may be configured with a set of beam Id's for which it should report measurements. Alternatively, the measuring node may be configured to report beams based on the beam type (e.g., serving beams, candidate beams, or detected beams). An alternate example of the Beam Measurement MAC CE may include a Beam Type field consisting on m bits, that is used to indicate the beam type of a reported beam (e.g. if m=2, then 00=Serving Beam, 01=Candidate Beam, 02=Detected Beam). The format with fewer bits; i.e. without the Beam Type field, may be preferred in some implementations. A threshold that is compared with the measurement quantity may also be used to determine which beams should be included in the report.

TABLE 5

Values of LCID for DL-SCH

| Index | LCID values |
| --- | --- |
| 00000 | CCCH |
| 00001-01010 | Identity of the logical channel |
| 01011-10010 | Reserved |
| 10011 | NR Beam Measurement |
| 10100 | NR Beam Training Command |
| 10101 | NR Beam Alignment Command |
| 10110 | NR Beam Tracking Command |
| 10111 | NR Beam Addition/Release Command |
| 11000 | Activation/Deactivation (4 octets) |
| 11001 | SC-MCCH, SC-MTCH (see note) |
| 11010 | Long DRX Command |
| 11011 | Activation/Deactivation (1 octet) |
| 11100 | UE Contention Resolution Identity |
| 11101 | Timing Advance Command |
| 11110 | DRX Command |
| 11111 | Padding |

NOTE:
Both SC-MCCH and SC-MTCH are not multiplexed with other logical channels in the same MAC PDU except for Padding

TABLE 6

Values of LCID for UL-SCH

| Index | LCID Values |
| --- | --- |
| 00000 | CCCH |
| 00001-01010 | Identity of the logical channel |
| 01011 | CCCH |
| 01100-10000 | Reserved |
| 10001 | NR Beam Measurement |
| 10010 | NR Beam Training Command |
| 10011 | NR Beam Alignment Command |
| 10100 | NR Beam Tracking Command |
| 10101 | NR Beam Addition/Release Command |
| 10110 | Truncated Sidelink BSR |
| 10111 | Sidelink BSR |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

Figure 16:
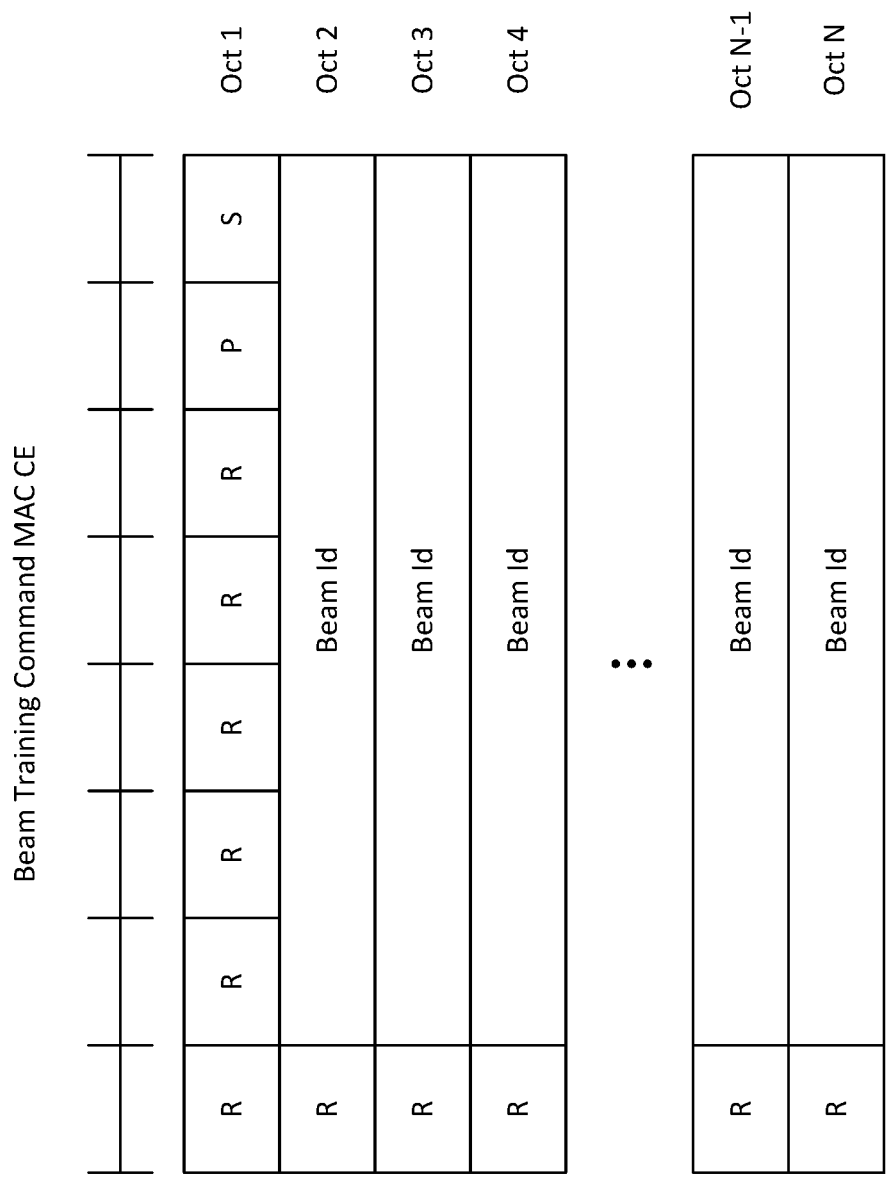
FIG. 16 illustrates an exemplary Beam Training Command MAC CE.

The NR Beam Training Command may be used to trigger the commencement of the NR Beam Training procedure. An exemplary NR Beam Training Command MAC CE is shown in FIG. 16. The NR Beam Training Command MAC CE may be identified by MAC a PDU subheader with LCID as specified in Table 5 and Table 6.

The disclosed NR Beam Training Command MAC CE has a variable size, allowing it to include beam Ids for a specified maximum number of beams, defined as M. Alternatively, the MAC CE may be defined with a fixed size and padding may be used when the number of beams for which beam training shall be performed is less than M.

The disclosed NR Beam Training Command MAC CE may include the following fields: S, P, R, and Beam ID. In this example, S would be the beam sweeping control bit. The S bit is set to "1" if beam sweeping should be performed and "0" otherwise. P would correspond to the beam pairing control bit. The P bit set to "1" if beam pairing should be performed and "0" otherwise. R would be the reserved bit and set to "0". Beam ID would be the beam and corresponding BT-RS that should be used for beam training.

Figure 17:
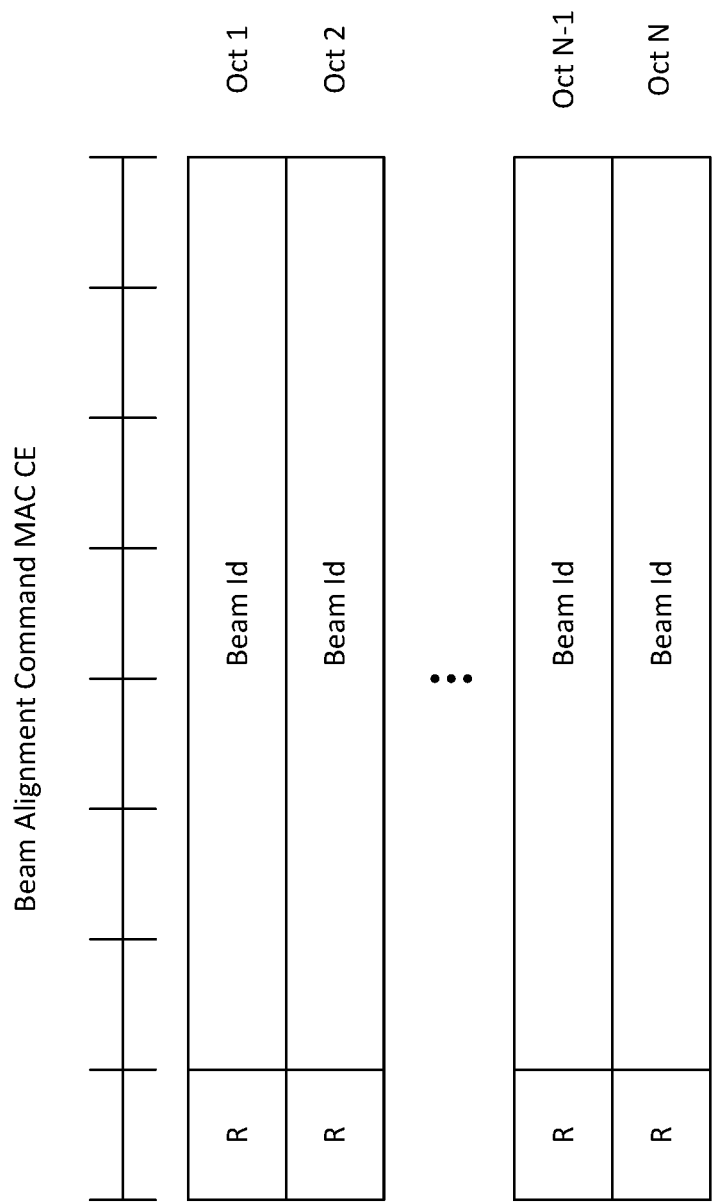
FIG. 17 illustrates an exemplary Beam Alignment Command MAC CE.

The NR Beam Alignment Command may be used to trigger the commencement of the NR Beam Alignment procedure. An exemplary NR Beam Alignment Command MAC CE is shown in FIG. 17. The NR Beam Alignment Command MAC CE may be identified by MAC a PDU subheader with LCID as specified in Table 5 and Table 6.

The disclosed NR Beam Alignment Command MAC CE has a variable size, allowing it to include beam Ids for a specified maximum number of beams, defined as M. Alternatively, the MAC CE may be defined with a fixed size and padding may be used when the number of beams for which beam alignment shall be performed is less than M. The disclosed NR Beam Alignment Command MAC CE may include the following fields. A beam Id field may include the beam and corresponding BT-RS that should be used for beam alignment. An R field may include a reserved bit, set to "0".

Figure 18:
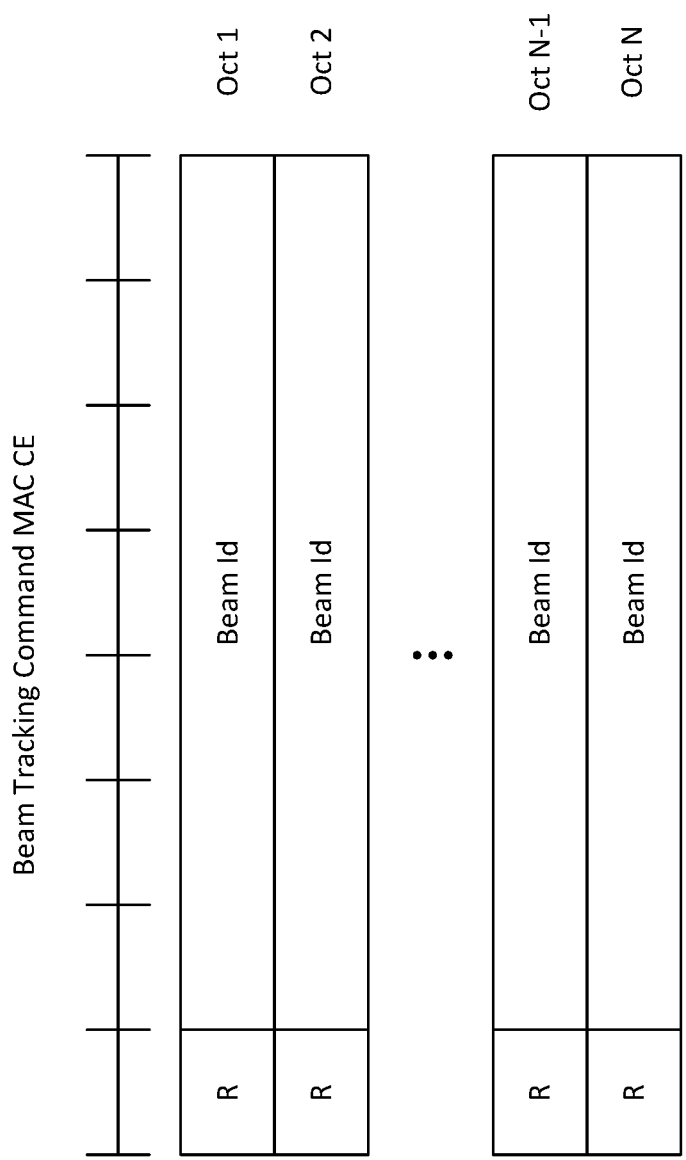
FIG. 18 illustrates an exemplary Beam Tracking Command MAC CE.

The NR Beam Tracking Command may be used to trigger the commencement of the NR Beam Tracking procedure. An exemplary NR Beam Tracking Command MAC CE is shown in FIG. 18. The NR Beam Alignment Command MAC CE may be identified by MAC a PDU subheader with LCID as specified in Table 5 and Table 6.

The disclosed NR Beam Tracking Command MAC CE has a variable size, allowing it to include Beam Ids for a specified maximum number of beams, defined as M. Alternatively, the MAC CE may be defined with a fixed size and padding may be used when the number of beams for which beam alignment shall be performed is less than M.

The disclosed NR Beam Tracking Command MAC CE includes the following fields. A beam Id field may include the beam and corresponding BT-RS that should be used for beam alignment. An R field may include a reserved bit, set to "0".

The NR Beam Addition or Release Command may be used to (re-)configure the set of serving beam(s) used for communication between the UE and a NW node (e.g., TRP or gNB), as discussed herein. The command may be used to add or release one or more serving beams. After a serving beam is released, it may be considered a candidate beam, provided it meets the serving beam criteria or a detected beam, if it does not meet the serving beam criteria but is still detected.

Figure 19:
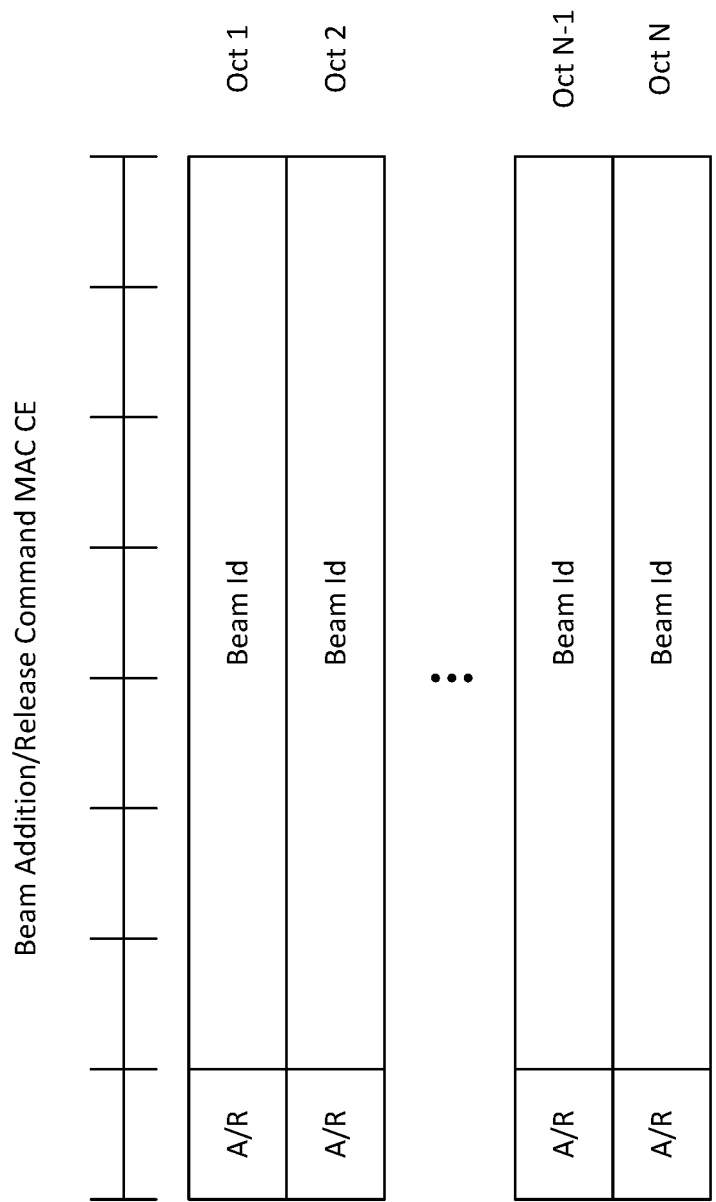
FIG. 19 illustrates an exemplary NR Beam Addition/Release Command MAC CE.

An exemplary NR Beam Addition or Release Command MAC CE is shown in FIG. 19. The NR Beam Addition or Release Command MAC CE may be identified by MAC a PDU subheader with LCID as specified in Table 5 and Table 6. The disclosed NR Beam Addition or Release Command MAC CE has a variable size, allowing it to include Beam Ids for a specified maximum number of beams, defined as M. Alternatively, the MAC CE may be defined with a fixed size and padding may be used when the number of beams being added/released is less than M. The disclosed NR Beam Addition/Release Command MAC CE may include the following fields: Beam Id and A/R. For beam ID, it may be considered the Id of the beam added or leased. For A/R, it may be considered the addition or release bit. The A/R bit is set to "0" if a beam is being added and "0" if a beam is being added and "0" if the beam is being released.

Figure 20:
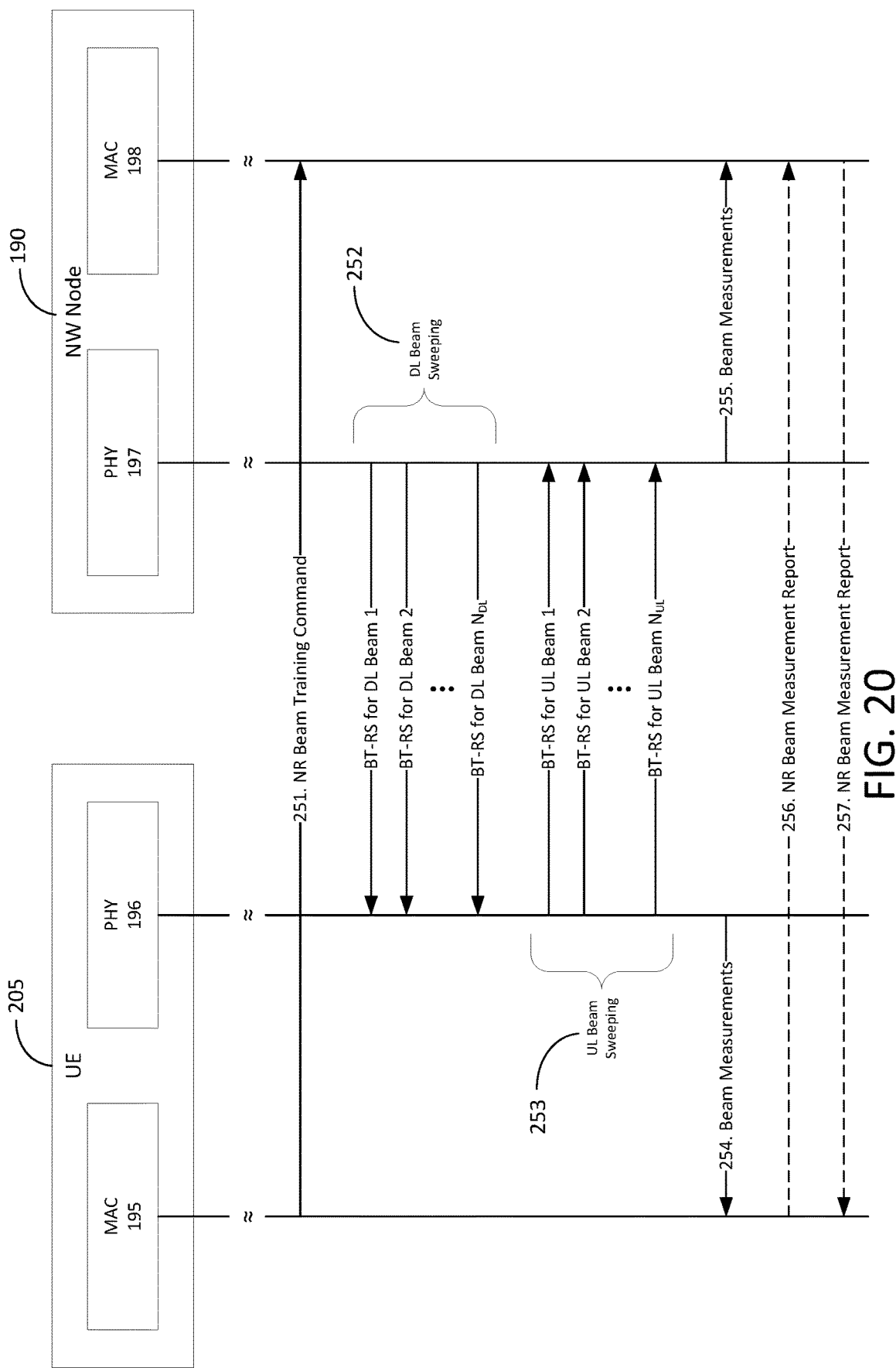
FIG. 20 illustrates an exemplary method associated with NR Beam Training.

NR Beam Training is a PHY layer procedure that may be configured and controlled by the MAC. The procedure may be used to discover and measure beams transmitted by the UE node or NW node (e.g., TRP 202 or gNB 201). An exemplary Beam Training command is defined in FIG. 16. It is comprised of an LCID that identifies the command and one or more beam Ids that indicate for which beams training shall be performed. FIG. 20 illustrates an exemplary method associated with NR Beam Training. NR Beam Training may include the transmission of BT-RSs from UE 205 or NW node 190, and may include beam sweeping or beam pairing if supported by the nodes. Beam sweeping is a process by which beams are switched on and off in a time division fashion. This may be used in high frequency systems since it would be difficult to build a system that can simultaneously transmit all the high gain beams that would be needed to cover the cell area.

A set of beam Ids that correspond to BT-RSs used for the beam training may be provided. Alternatively, the transmitting node may select the beams autonomously, based on TRP load, beam load, traffic distribution, transport resources, hardware resources, or Operator-defined policies. For example, beam training command may trigger a node to redirect an existing beam or transmit on a new beam in the direction of the receiving node. Whether to redirect an existing beam or transmit on a new beam, in this example, may depend on the load and hardware resources (e.g., hardware capabilities of the transmitting node, which may be relevant to how many beams it could transmit simultaneously). The receiving node may blindly detect the transmitted beams if a set of beam Ids is not provided. Signaling between the peer MAC entities may be used to control the procedure and report the results. Note that blindly detecting may refer to the receiving node not knowing which reference signal is being transmitted and trying multiple hypotheses to determine which reference signal is actually being used.

FIG. 20 illustrates an exemplary method associated with NR Beam Training. At step 251, MAC 195 of UE 205 may commence with the transmission of an NR Beam Training Command. In the example illustrated in FIG. 20, the NR Beam Training Command may be transmitted from the MAC 195 of UE 205 to the peer MAC 198 in NW node 190 (e.g. TRP 202). Alternatively, NW node 190 may transmit the NR Beam Training Command to trigger the commencement of the procedure. The NR Beam Training Command may be transmitted using a random access channel, grantless channel, or any other channel providing communication between UE 205 and NW node 190. A set of beam Ids that correspond to BT-RSs used for the beam training may be provided. Alternatively, the transmitting node (e.g., NW node 190 or UE 205) may select the beams autonomously, based on TRP load, beam load, traffic distribution, transport resources, hardware resources, or Operator defined policies. The receiving node (e.g., UE 205) may blindly detect the transmitted beams if a set of beam Ids is not provided.

At step 252, NW node 190 may perform DL beam sweeping with UE 205. At step 253, UE 205 may perform UL beam sweeping with NW node 190. In situations when beam pairing is desired, the receiving node may sweep the Rx beam to determine the optimal Rx beam to pair with a given Tx beam. At step 254, PHY 196 may provide beam measurements to MAC 195 of UE 205. At step 255, PHY 197 may provide beam measurements to MAC 198 of NW node 190. Step 254 or step 255 may occur during (e.g., step 251-step 253) or following beam training. At step 256, MAC 195 of UE 205 may signal an NR Beam Measurement report to peer MAC 198 of NW node 190. This step (and other NR Beam Measurement reporting steps herein in other FIGs) may be based on criteria/format as discussed in association with Table 4 herein. At step 257, MAC 198 of NW node 190 may signal an NR Beam Measurement report to peer MAC 195 of UE 205. NR Beam Measurement report of step 256 or step 257 may include information from step 254 or step 255 respectively. It can be significant that the measurements may be performed on the beam training reference signals after the apparatus (e.g., UE) issues the beam training command that triggers another apparatus (e.g., the gNB) to begin transmitting them.

The execution of sending the beam training command at step 251 may be triggered by one or more of the events in Table 4 (e.g. NR-D2 the number of serving beams is less than a threshold, NR-D4 the number of candidate beams is less than a threshold). For example, the UE may be performing measurements periodically and when an event occurs, UE 205 may, in response to the event, send the beam training command to trigger the transmission of beam training reference signal (BT-RS) from the current and/or new beams. The trigger of the beam alignment command or beam tracking command may also be based on a trigger, such as Table 4.

NR Beam Alignment is a PHY layer procedure that may be configured and controlled by the MAC. NR Beam Alignment may be used to refine the alignment of a beam, which may include adjustments to the beamwidth, beam direction, etc. The procedure may include the transmission of BT-RSs from the UE or NW node and feedback from the receiving node to the transmitting node to align the beam (e.g. adjust the precoding matrix). A set of beam Ids that correspond to the beams that require alignment may be provided. Alternatively, if a set of beam Ids is not explicitly signaled, the node may assume the beams requiring alignment are those beams configured as serving beams. Signaling between the peer MAC entities may be used to control the procedure and report the results.

Figure 21:
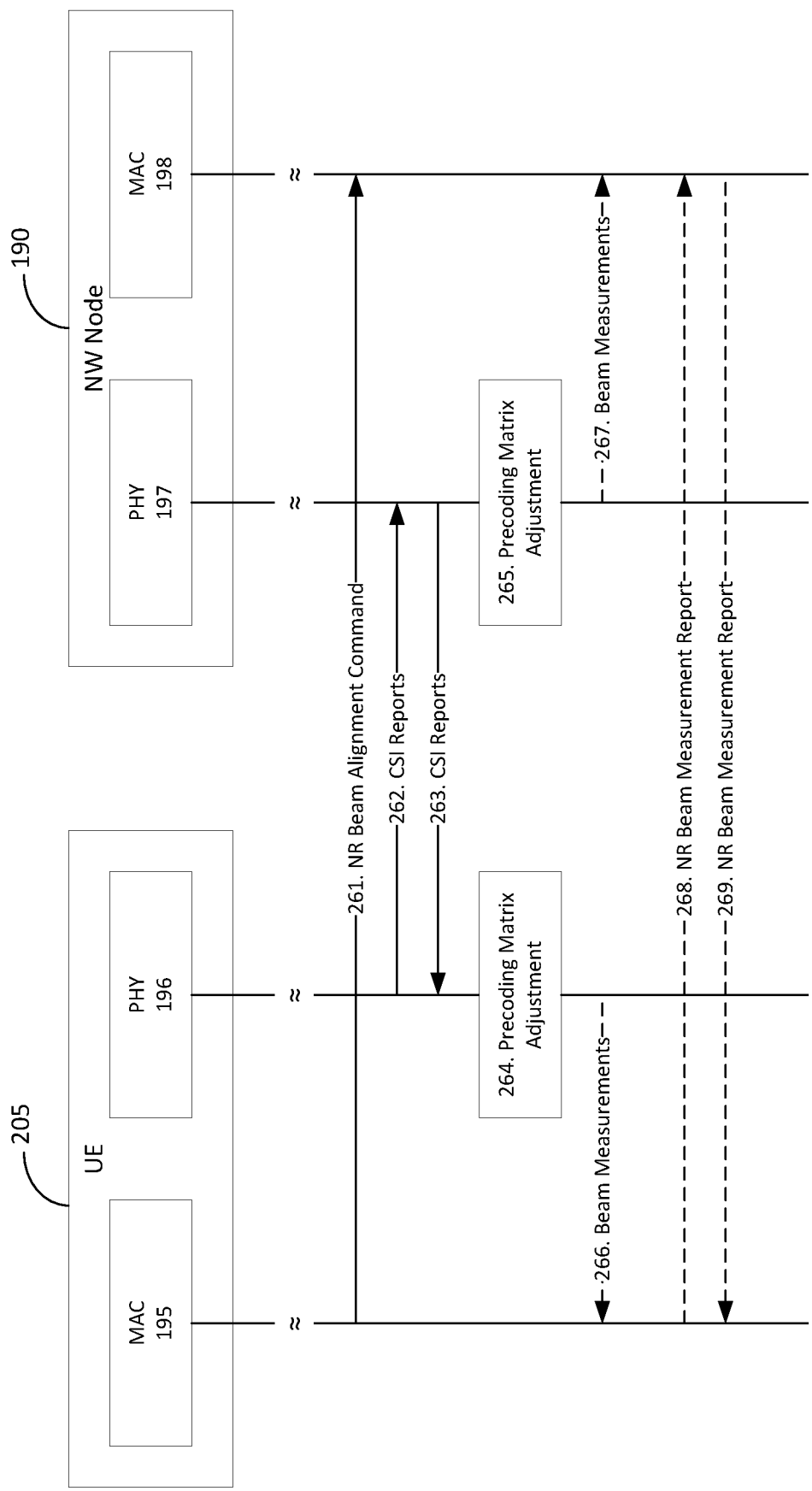
FIG. 21 illustrates an exemplary method associated with NR Beam Alignment.

FIG. 21 illustrates an exemplary method associated with NR Beam Alignment. At step 261, MAC 195 of UE 205 may commence with the transmission of an NR beam alignment Command, wherein the transmission of this command may be triggered by one or more of the events in Table 4. In the example illustrated in FIG. 21, the NR Beam Alignment Command is transmitted from MAC 195 of UE 205 to the peer MAC 198 in NW node 190. Alternatively, NW node 190 may transmit the NR Beam Alignment Command to trigger the commencement of the procedure. The NR Beam Alignment Command may be transmitted using a random access channel, grantless channel, or any other channel providing communication between UE 205 and NW node 190. The NR Beam Alignment Command may include a set of a set of beam Ids that correspond to the beams that require alignment. Alternatively, if a set of beam Ids is not explicitly signaled, the node (e.g., UE 205, but could be NW node 190 as contemplated herein) may, by default, determine the beams requiring alignment as those beams configured as serving beams.

At step 262, PHY 196 of UE 205 may signal Channel State Information (CSI) reports to the peer PHY 197 of NW node 190. At step 263, PHY 197 of NW node 190 may signal CSI reports to the peer PHY 196 of UE 205. The CSI reports may be used to refine the alignment of the beam(s), e.g. adjust the precoding matrix, beamforming weights, etc. For example, at step 264, UE 205 adjusts the precoding matrix based on CSI report of step 263. At step 265, NW node 190 adjusts the precoding matrix based on CSI report of step 262. At step 266, PHY 196 of UE 205 may provide beam measurements to MAC 195 of UE 205. At step 267, PHY 197 of NW node 190 may provide beam measurements to MAC 198 of NW node 190. Step 266 or step 267 may occur during (e.g., step 261-step 264) or following beam alignment. At step 268, MAC 195 of UE 205 may signal an NR Beam Measurement report to peer MAC 198 of NW node 190. At step 269, MAC 198 of NW node 190 may signal an NR Beam Measurement report to peer MAC 195 of UE 205. NR Beam Measurement report of step 268 or step 269 may include information from step 266 or step 267 respectively.

NR Beam Tracking is a PHY layer procedure that may be configured and controlled by the MAC. NR Beam Tracking may be used to maintain the alignment of beams (e.g., the serving beams) used for communication between the UE and NW node. Alternatively, the procedure may also be used to maintain alignment for the candidate beams. The procedure may include the periodic transmission of BT-RSs from the UE or NW node or feedback from the receiving node to the transmitting node to maintain alignment of the beam, e.g. adjust the precoding matrix. A set of beam Ids that correspond to beams that require tracking may be provided, where the set of beam Ids may be a subset of the serving beams or candidate beams. Alternatively, if a set of beam Ids is not explicitly signaled, the node may determine that the beams that require tracking are those beams configured as serving beams. Signaling between the peer MAC entities may be used to control the procedure and report the results.

Figure 22:
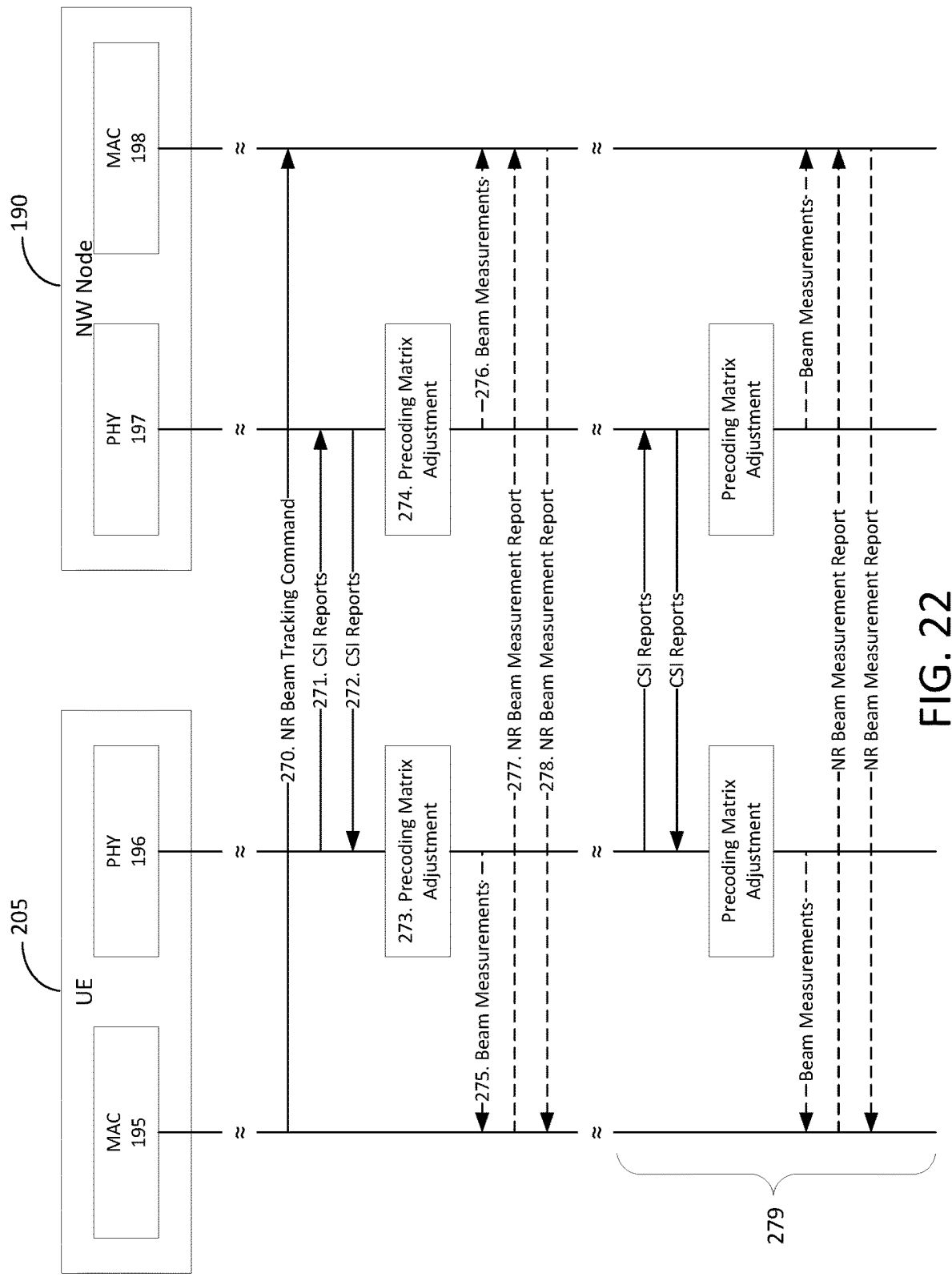
FIG. 22 illustrates an exemplary method associated with NR Beam Tracking.

FIG. 22 illustrates an exemplary method associated with NR Beam Tracking. NR beam tracking may commence with the transmission of an NR Beam Tracking Command as in step 270, wherein the transmission of this command may be triggered by one or more of the events in Table 4. In the example illustrated in FIG. 22, the NR Beam Tracking Command is transmitted from MAC 195 of UE 205 to the peer MAC 198 in NW node 190. Alternatively, NW node 190 may transmit the NR Beam Tracking Command to trigger the commencement of the procedure. The NR Beam Tracking Command may be transmitted using a random access channel, grantless channel, or any other channel providing communication between UE 205 and NW node 190. A set of beam Ids that correspond to beams that require tracking may be provided, where the set of beam Ids may be a subset of the serving beams or candidate beams. Alternatively, if a set of beam Ids is not explicitly signaled, the node (e.g., UE 205, but could be NW node 190 as contemplated herein) may determine that the beams requiring tracking are those beams configured as serving beams.

At step 271, PHY 196 of UE 205 may signal CSI reports to the peer PHY 197 of NW node 190. At step 272, PHY 197 of NW node 190 may signal CSI reports to the peer PHY 196 of UE 205. The CSI reports may be used to refine the alignment of the beam(s), e.g. adjust the precoding matrix, beamforming weights, etc. For example, at step 273, UE 205 adjusts the precoding matrix based on CSI report of step 272. At step 274, NW node 190 adjusts the precoding matrix based on CSI report of step 271. At step 275, PHY 196 of UE 205 may provide beam measurements to MAC 195 of UE 205. At step 276, PHY 197 of NW node 190 may provide beam measurements to MAC 198 of NW node 190. Step 275 or step 276 may occur during (e.g., step 271-step 273) or following beam tracking. At step 277, MAC 195 of UE 205 may signal an NR Beam Measurement report to peer MAC 198 of NW node 190. At step 278, MAC 198 of NW node 190 may signal an NR Beam Measurement report to peer MAC 195 of UE 205. NR Beam Measurement report of step 277 or step 278 may include information from step 275 or step 276 respectively. At step 279, the periodic series of steps providing feedback from the receiving node to the transmitting node to maintain alignment of the beam, e.g. adjust the precoding matrix.

Figure 23:
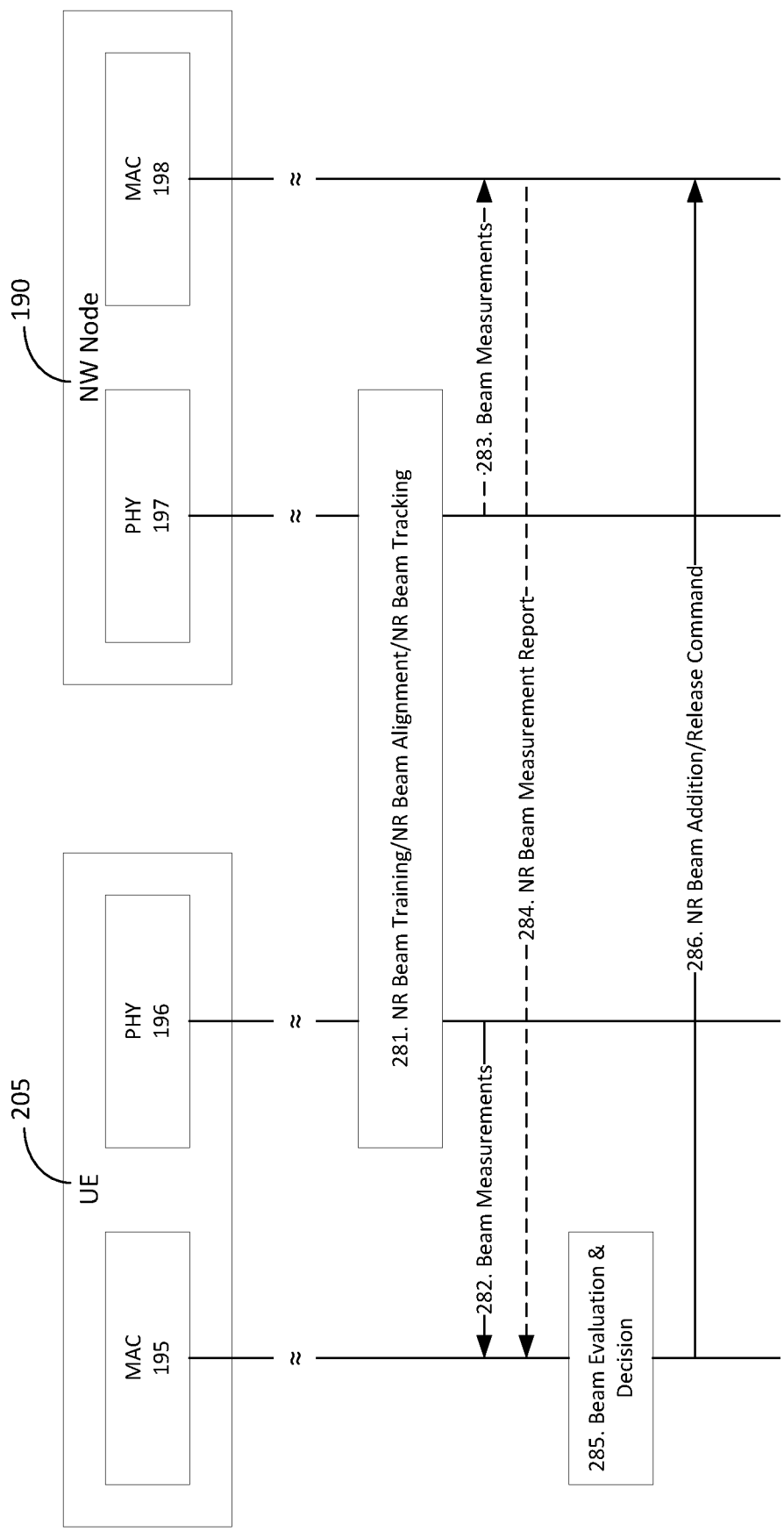
FIG. 23 illustrates an exemplary method associated with NR Beam Configuration (UE Controlled)

NR Beam Configuration is a MAC layer procedure that may be used to (re-) configure the set of serving beam(s) used for communication between UE 205 and NW node 209 (e.g., gNB or TRP). This command may be transmitted as a MAC CE. This procedure may help enable reliable and robust communications. Without this mechanism, when the quality of a beam dropped due to mobility, blockage, etc. UE 205 may not be able to communicate with the NW node 190. Prior to (re-) configuring the serving beam(s), the NR Beam Training, NR Beam Alignment, or NR Beam Tracking procedures may be performed to gather information to evaluate the beams and make decisions about the beam configuration. FIG. 23 illustrates an exemplary method associated with NR Beam Configuration (UE Controlled), as discussed below. NR beam configuration will typically follow completion of the NR Beam Training, NR Beam Alignment, or NR Beam Tracking procedures of step 281. Determination of the beam configuration (e.g., step 285) may be based on UE 205 and NW 190 measurements resulting from these procedures. In addition, other inputs such as TRP load, traffic distribution, transport resources, hardware resources, or Operator defined policies may be taken into account.

At step 282, PHY 196 of UE 205 may provide beam measurements to MAC 195 of UE 205. At step 283, PHY 197 of NW node 190 may provide beam measurements to MAC 198 of NW node 190. At step 284, MAC 195 of UE 205 may obtain an NR Beam Measurement report from peer MAC 198 of NW node 190. At step 285, beam evaluation and decision is performed by UE 205. As disclosed herein, beam evaluation and decision may provide for ranking of beam measurements, comparisons with thresholds, one or more of the events in Table 4, etc. to determine which beams should be used for communication. At step 286, the NR Beam Addition or Release Command is transmitted from MAC 195 of UE 205 to the peer MAC 198 in NW node 190. The NR Beam Addition or Release Command may be transmitted using a random access channel, grantless channel, or any other channel providing communication between the UE and NW node.

Figure 24:
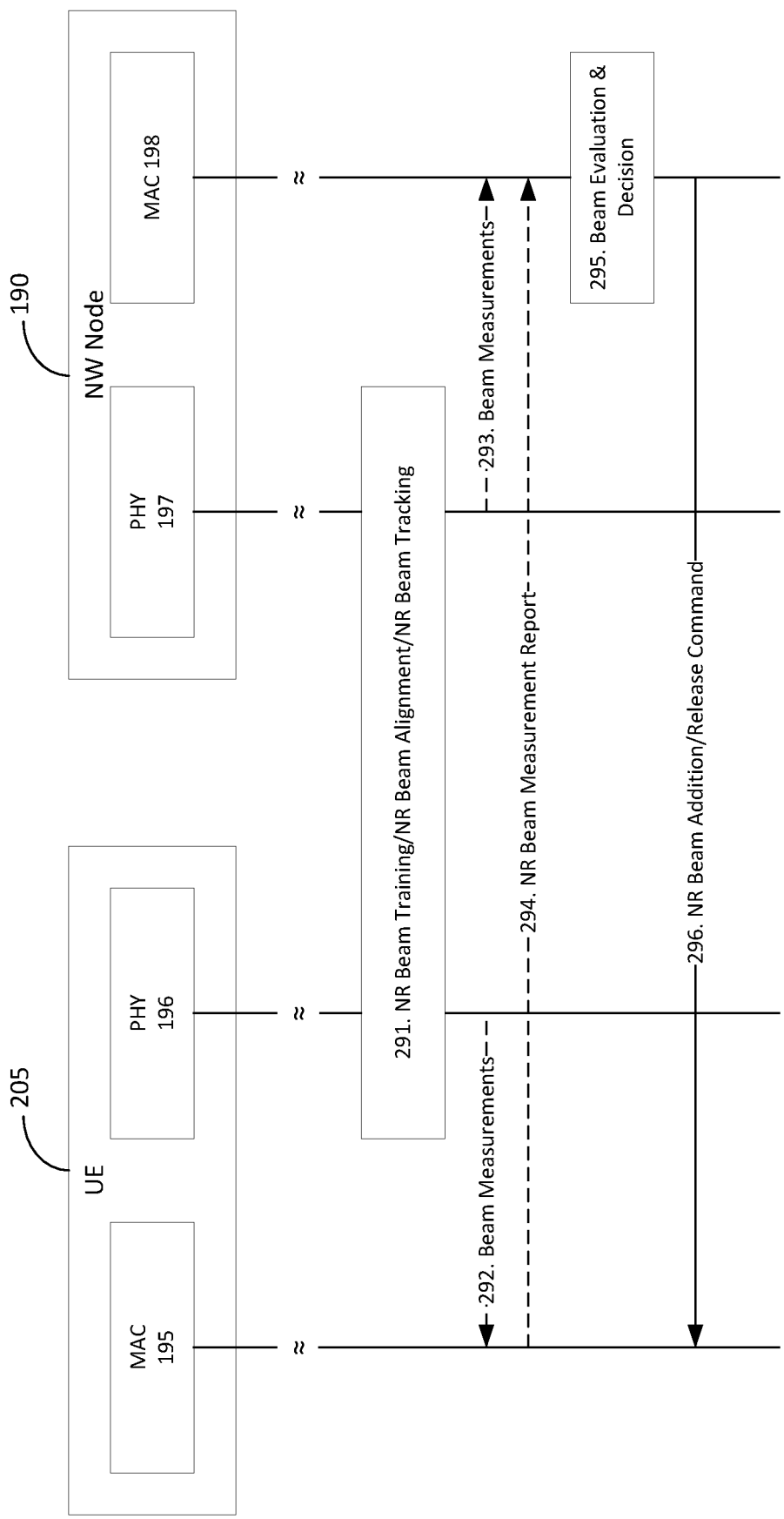
FIG. 24 illustrates an exemplary method associated with NR Beam Configuration (NW Controlled)

FIG. 24 illustrates an exemplary method associated with NR Beam Configuration (NW Controlled), as discussed below. NR beam configuration will typically follow completion of the NR Beam Training, NR Beam Alignment, or NR Beam Tracking procedures of step 291. Determination of the beam configuration (e.g., step 295) may be based on UE 205 measurements or NW 190 measurements resulting from these procedures. In addition, other inputs such as TRP load, traffic distribution, transport resources, hardware resources, or Operator defined policies may be taken into account. At step 292, PHY 196 of UE 205 may provide beam measurements to MAC 195 of UE 205. At step 293, PHY 197 of NW node 190 may provide beam measurements to MAC 198 of NW node 190. At step 294, MAC 198 of NW node 190 may obtain an NR Beam Measurement report from peer MAC 195 of UE 205. At step 295, beam evaluation and decision is performed by NW node 190. Beam evaluation and decision is performed by NW node 190. As disclosed herein, beam evaluation and decision may provide for ranking of beam measurements, comparisons with thresholds, one or more of the events in Table 4, etc. to determine which beams should be used for communication. At step 296, the NR Beam Addition or Release Command is transmitted from MAC 198 of NW node 190 to the peer MAC 195 in UE 205.

The NR Beam Addition or Release Command may be transmitted using a random access channel, grantless channel, or any other channel providing communication between the UE and NW node.

Figure 25:
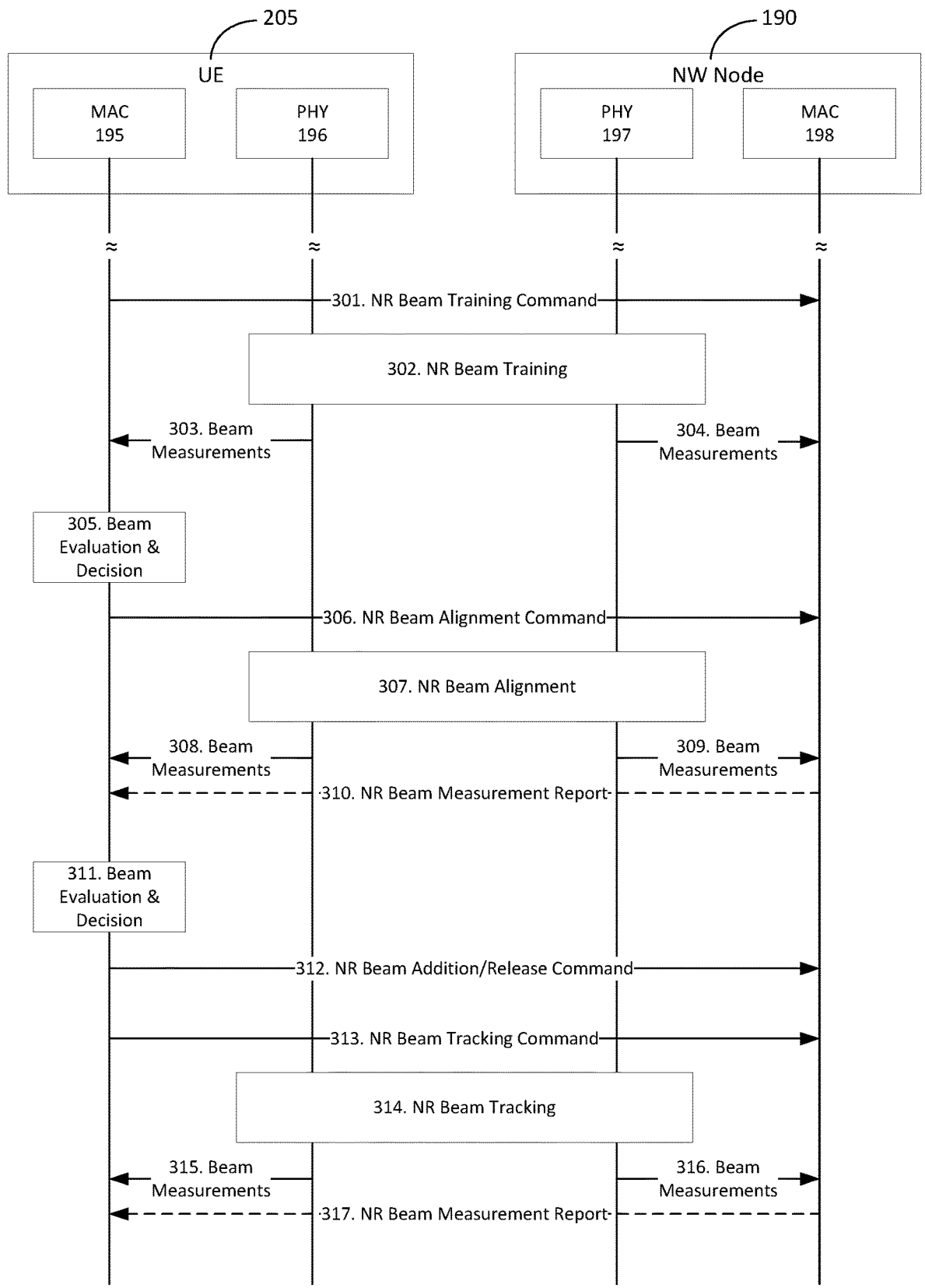
FIG. 25 illustrates an exemplary method associated with NR Initial Access (UE Controlled)
Figure 26:
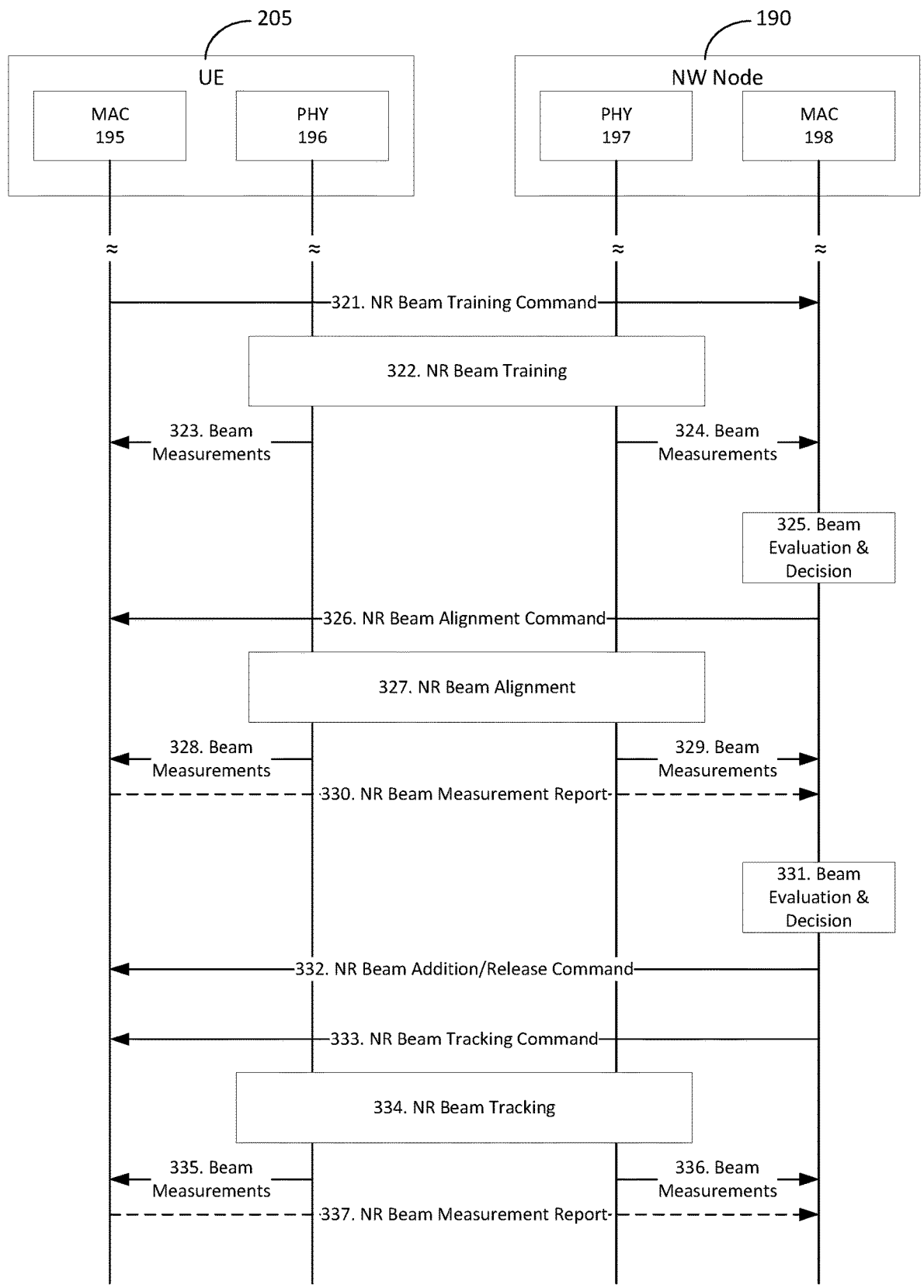
FIG. 26 illustrates an exemplary method associated with NW controlled initial access.

Exemplary signaling for initial access in NR beam centric networks is shown in FIG. 25 and FIG. 26. The signaling illustrated in FIG. 25 is for UE controlled initial access, while the signaling in FIG. 26 is for NW controlled initial access.

FIG. 25 illustrates an exemplary method associated with NR Initial Access (UE Controlled), as discussed below. At step 301, MAC 195 sends an NR Beam Training command to MAC 198. Initial access commences with the transmission of an NR Beam Training Command from the MAC entity of the UE to the peer MAC entity in the NW node. NR Beam Training Command may be transmitted using a random access channel, grantless channel, or any other channel providing communication between the UE and NW node.

At step 302, there is NR Beam training (e.g., FIG. 20) between NW node 190 and UE 205. At step 303, PHY 196 of UE 205 may provide beam measurements to MAC 195 of UE 205. At step 304, PHY 197 of NW node 190 may provide beam measurements to MAC 198 of NW node 190. During or following beam training, the PHY layers of each node may provide beam measurements to their respective MAC layers. At step 305, beam evaluation and decision is performed by UE 205. UE evaluates the beam measurements resulting from the beam training and may perform beam alignment, if required (e.g., a threshold measurement is reached). At step 306, MAC 198 of NW node 190 obtains an NR Beam alignment command from MAC 195 of UE 205. At step 307, there is NR Beam Alignment (e.g., FIG. 21) between NW node 190 and UE 205. At step 308, PHY 196 of UE 205 may provide beam measurements to MAC 195 of UE 205. At step 309, PHY 197 of NW node 190 may provide beam measurements to MAC 198 of NW node 190. During or following beam alignment, the PHY layers of each node may provide beam measurements to their respective MAC layers. At step 310, UE 205 may obtain a beam measurement report from NW node 190, based on the beam measurements of step 309. At step 311, beam evaluation and decision is performed by UE 205. UE 205 may evaluate the beam measurements resulting from the beam training and the beam alignment procedures and performs NR Beam Configuration (e.g., FIG. 23).

With continued reference to FIG. 25, at step 312, MAC 198 of NW node 190 may obtain NR Beam Addition or Release commend from MAC 195 of UE 205. At step 313, MAC 198 of NW node 190 may obtain NR Beam tracking commend from MAC 195 of UE 205. At step 314, there may be NR Beam Tracking (e.g., FIG. 22) between UE 205 and NW node 190. At step 315, PHY 196 of UE 205 may provide beam measurements to MAC 195 of UE 205. At step 316, PHY 197 of NW node 190 may provide beam measurements to MAC 198 of NW node 190. At step 317, UE 205 may obtain a beam measurement report from NW node 190, based on the beam measurements of step 316.

FIG. 26 illustrates an exemplary method associated with NW controlled initial access, as discussed below. At step 321, MAC 195 sends an NR Beam Training command to MAC 198. Initial access commences with the transmission of an NR Beam Training Command from the MAC entity of the UE to the peer MAC entity in the NW node. NR Beam Training Command may be transmitted using a random access channel, grantless channel, or any other channel providing communication between UE 205 and NW node 190.

At step 322, there is NR Beam training (e.g., FIG. 20) between NW node 190 and UE 205. At step 323, PHY 196 of UE 205 may provide beam measurements to MAC 195 of UE 205. At step 324, PHY 197 of NW node 190 may provide beam measurements to MAC 198 of NW node 190. During or following beam training, the PHY layers of each node may provide beam measurements to their respective MAC layers. At step 325, beam evaluation and decision is performed by NW node 190. NW node 190 evaluates the beam measurements resulting from the beam training and may perform beam alignment, if required. At step 326, MAC 198 of NW node 190 obtains an NR Beam alignment command from MAC 198 of NW node 190. At step 327, there is NR Beam Alignment (e.g., FIG. 21) between NW node 190 and UE 205. At step 328, PHY 196 of UE 205 may provide beam measurements to MAC 195 of UE 205. At step 329, PHY 197 of NW node 190 may provide beam measurements to MAC 198 of NW node 190. During or following beam alignment, the PHY layers of each node may provide beam measurements to their respective MAC layers. At step 330, UE 205 may send a beam measurement report to NW node 190, based on the beam measurements of step 328. At step 311, beam evaluation and decision is performed by NW node 190. NW node 190 may evaluate the beam measurements resulting from the beam training and the beam alignment procedures and performs NR Beam Configuration (e.g., FIG. 23).

With continued reference to FIG. 25, at step 332, MAC 198 of NW node 190 may send NR Beam Addition or Release commend to MAC 195 of UE 205. At step 333, MAC 198 of NW node 190 may send NR Beam tracking commend to MAC 195 of UE 205. At step 334, there may be NR Beam Tracking (e.g., FIG. 22) between UE 205 and NW node 190. At step 335, PHY 196 of UE 205 may provide beam measurements to MAC 195 of UE 205. At step 336, PHY 197 of NW node 190 may provide beam measurements to MAC 198 of NW node 190. At step 337, UE 205 may send a NR beam measurement report to NW node 190, based on the beam measurements of step 335.

Figure 27:
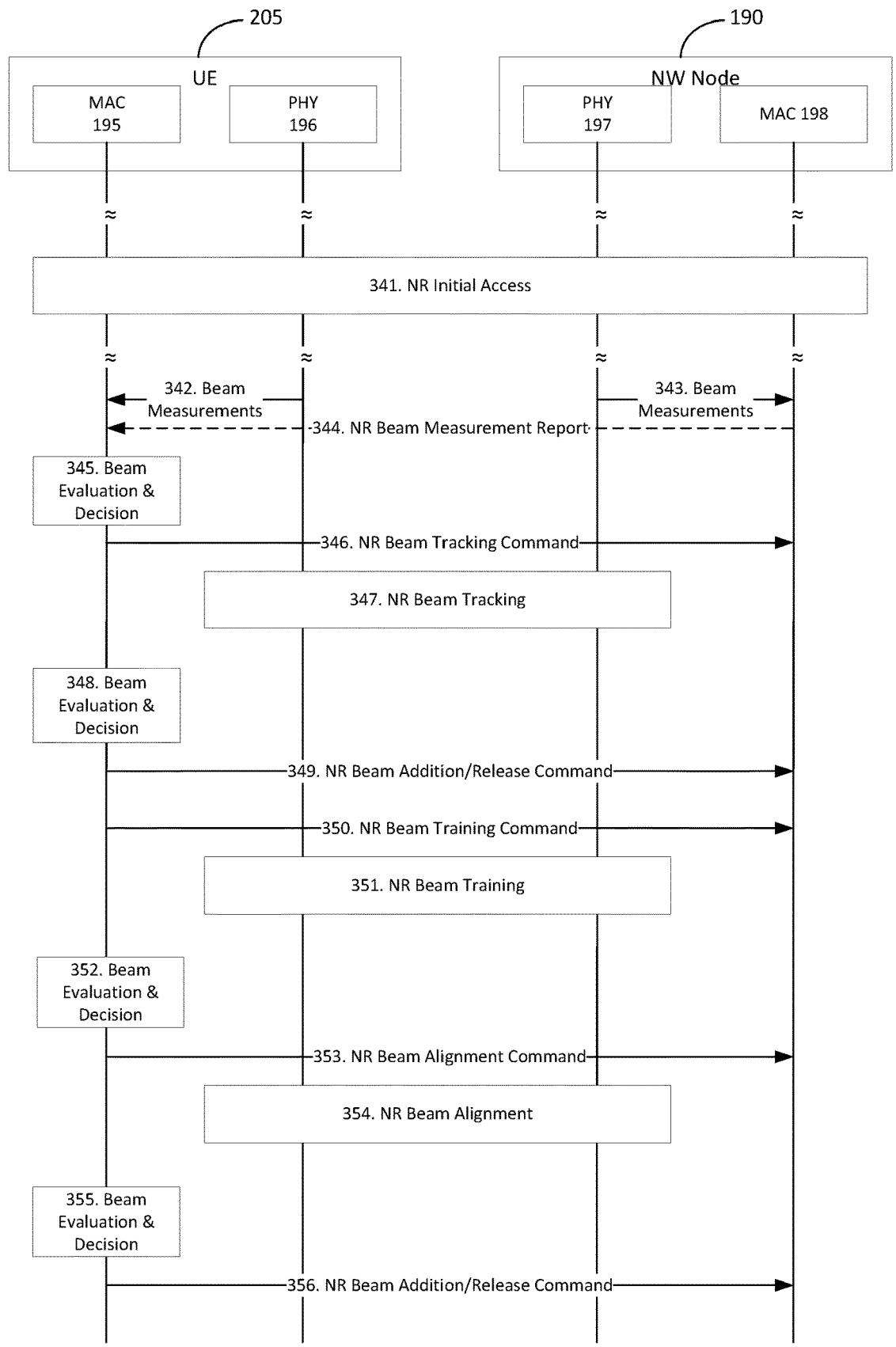
FIG. 27 illustrates an exemplary method associated with NR Mobility Management (UE Controlled)
Figure 28:
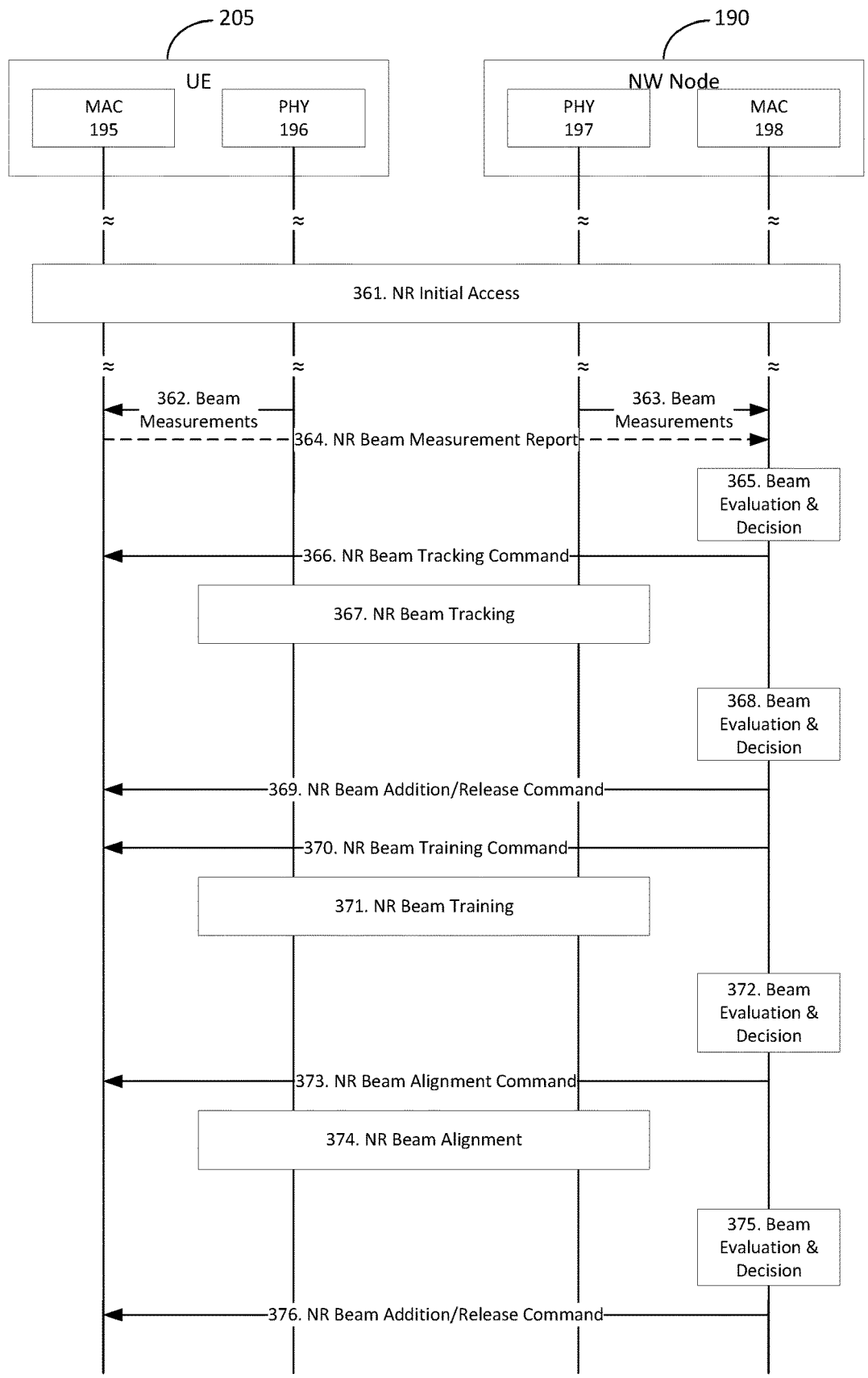
FIG. 28 illustrates an exemplary method associated with NR Mobility Management (NW Controlled)

Exemplary signaling for mobility management in NR beam centric networks is shown in FIG. 27 and FIG. 28. The signaling illustrated in FIG. 27 is for UE controlled mobility management, while the signaling in FIG. 28 is for NW controlled mobility.

FIG. 27 illustrates an exemplary method associated with NR Mobility Management (UE Controlled), as discussed below. After establishing a connection (step 341) with NW node 190, UE 205, at step 345, may evaluate the beam measurements provided by the PHY layer (e.g., step 342). Beam measurements (step 343 and step 344) may be provided by the peer MAC entity (e.g., MAC 198 of NW node 190) may also be evaluated. If not already running, UE 205 may trigger commencement of the NR Beam Tracking procedure (step 347) by transmitting an NR Beam Tracking Command (step 346) to the peer MAC 198 of NW node 190. Reasons for triggering commencement of the NR Beam Tracking procedure may include, but are not limited to, the following: 1) one or more serving beams no longer meet the serving beam criteria; or 2) change in the UE mobility state, such as transition from normal-mobility state to medium-mobility or high-mobility state as specified in 3GPP TS 36.304. UE 205 may disable beam tracking for one or beams if the serving criteria is again met. Alternatively, the beam tracking may continue to be performed periodically.

With continued reference to FIG. 27, if the criteria for one or more serving beams is not met for a given amount of time, for example, UE 205 may update the beam configuration by adding or releasing one or more serving beams (step 349). The beam(s) added may be selected from the list of candidate beams. The beam(s) released may be the beams whose NR-RSRP is below a configured threshold. If there are not any candidate beams to add, UE 205 may trigger commencement of the NR Beam Training procedure to discover additional beams (step 350 and step 351). At step 352, UE 205 may do another beam evaluation and make decision. The decision may include UE 205 triggering commencement of the NR Beam Alignment procedure to align the newly discovered beams (step 353 and step 354). UE 205 may evaluate the newly discovered beams to determine if any of them meet the serving beam criteria and may be considered candidate beams (step 355). UE 205 may then, at step 356, trigger configuration of one or more of the candidate beams as serving beams.

FIG. 28 illustrates an exemplary method associated with NR Mobility Management (NW Controlled), as discussed below. After UE 205 establishes a connection with NW node 190 (at step 361), NW node 190 evaluates the beam measurements provided by the PHY layer (step 362, step 363, step 364, step 365). Beam measurements provided by the peer MAC 195 of UE 205 may also be evaluated. If not already running, NW node 190 may trigger commencement of the NR Beam Tracking procedure (step 367) by transmitting an NR Beam Tracking Command (step 366) to the peer MAC 195 of UE 205. Reasons for triggering commencement of the NR Beam Tracking procedure may include, but are not, limited to the following: 1) one or more serving beams no longer meet the serving beam criteria; or 2) change in the UE mobility state, such as transition from Normal-mobility state to Medium-mobility or High-mobility state as specified in 3GPP TS 36.304. NW node 190 may disable beam tracking for one or beams if the serving criteria is again met (step 368). Alternatively, the beam tracking may continue to be performed periodically.

With continued reference to FIG. 28, if the criteria for one or more serving beams is not met for a given amount of time, NW node 190 may update the beam configuration by adding or releasing one or more serving beams (step 369). The beam(s) added may be selected from the list of candidate beams. The beam(s) released may be the beams whose NR-RSRP is below a configured threshold. If there are not any candidate beams to add, NW node 190 may trigger commencement of the NR Beam Training procedure (step 370 and step 371) to discover additional beams. Based on evaluation and decision of step 372, NW node 190 may trigger commencement of the NR Beam Alignment procedure (step 373 and step 374) to align the newly discovered beams. At step 375, NW node 190 evaluates the newly discovered beams to determine if any of them meet the serving beam criteria and can be considered candidate beams. NW node 190 may then trigger configuration of one or more of the candidate beams as serving beams, such as step 376 that includes a NR beam addition or release.

It is contemplated herein that there may be periodic communication of measurements throughout a wireless communication session. Measurements reaching a particular threshold may trigger any of the NR Beam Management procedures, which may include NR Beam Training, NR Beam Alignment, NR Beam Tracking, or NR Beam Configuration, among other things.

Figure 30:
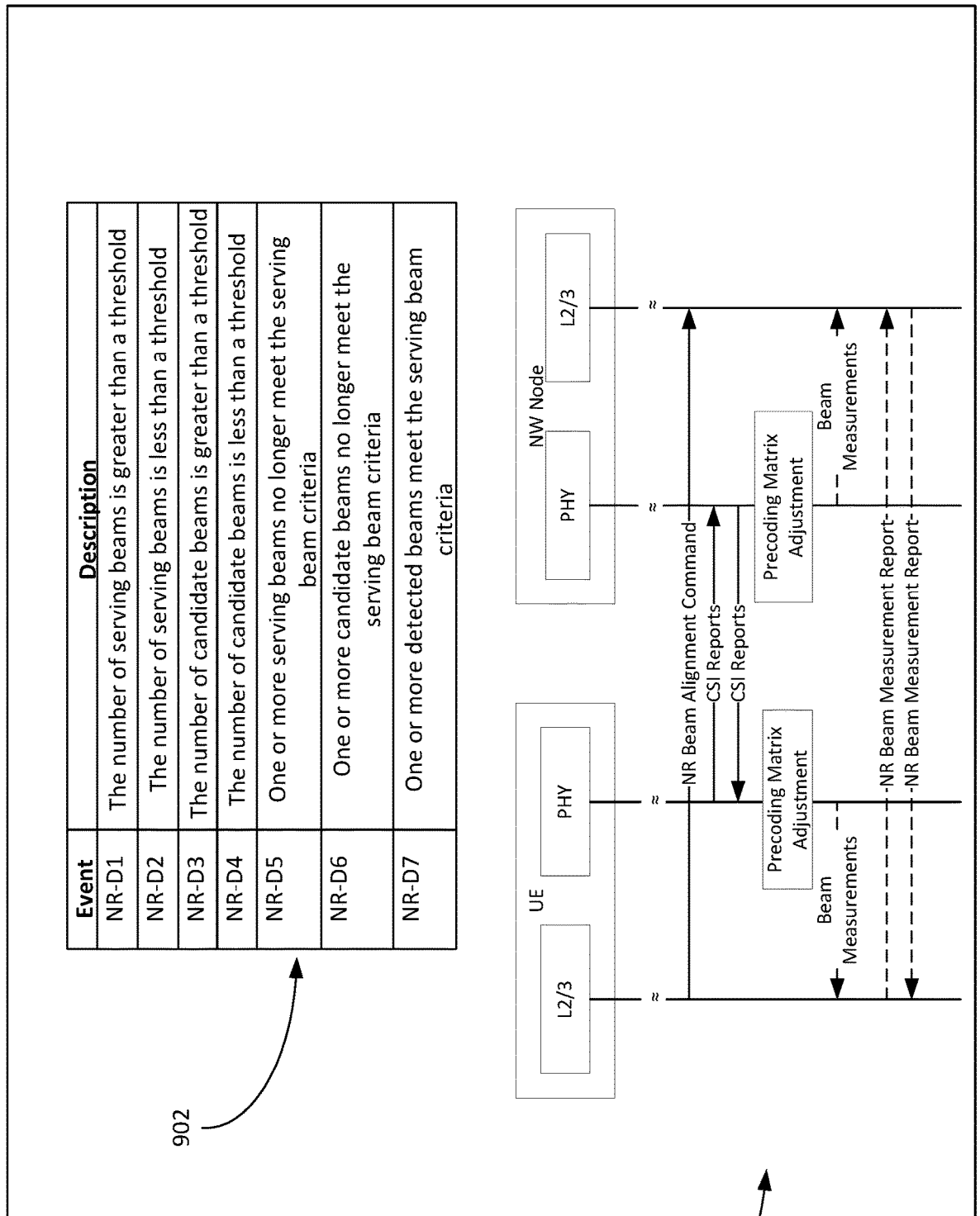
FIG. 30 illustrates an exemplary display (e.g., graphical user interface) that may be generated based on the methods and systems discussed herein.

FIG. 30 illustrates an exemplary display (e.g., graphical user interface) that may be generated based on the methods and systems discussed herein. Display interface 901 (e.g., touch screen display) may provide text in block 902 associated with beam management, such as the parameters of Table 4 through Table 6. In another example, progress of any of the steps (e.g., sent messages or success of steps) discussed herein may be displayed in block 902. In addition, graphical output 903 may be displayed on display interface 901. Graphical output 903 may be the topology of the devices in a cluster, a graphical output of the progress of any method or systems discussed herein, or the like The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 29A:
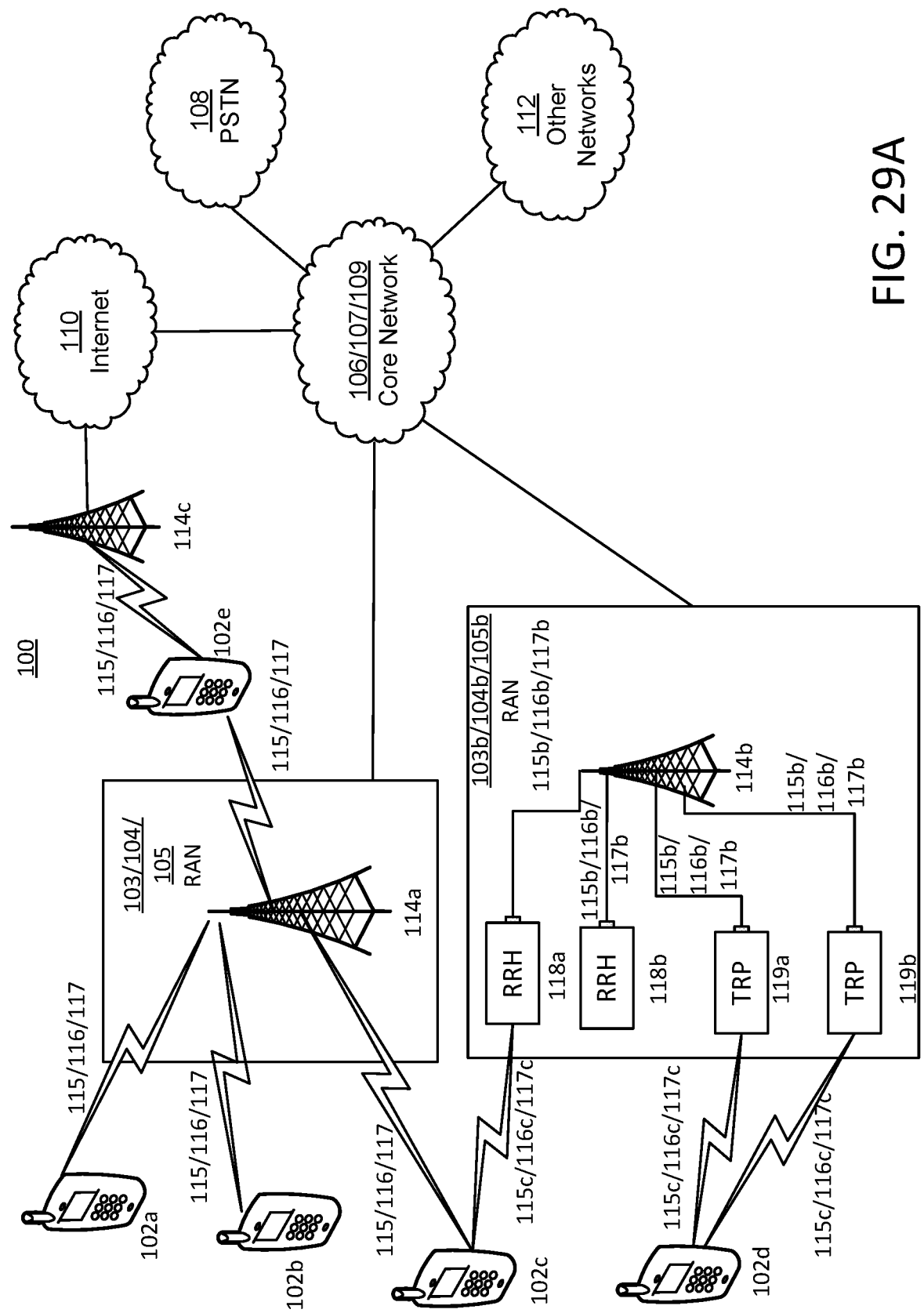
FIG. 29A illustrates an example communications system 100 in which the methods and apparatuses described and claimed herein associated with beam management.

FIG. 29A illustrates an example communications system 100 in which the methods and apparatuses described and claimed herein. As shown, the example communications system 100 may include wireless transmit/receive units (WTRUs) 102*a*, 102*b*, 102*c*, or 102*d* (which generally or collectively may be referred to as WTRU 102), a radio access network (RAN) 103/104/105/103*b*/104*b*/105*b*, a core network 106/107/109, a public switched telephone network (PSTN) 108, the Internet 110, and other networks 112, though it will be appreciated that the disclosed subject matter herein are examples for any number of WTRUs, base stations, networks, or network elements. WTRU 102 may be associated with UEs discussed herein, such as of FIG. 20-FIG. 28. Each of the WTRUs 102a, 102b, 102c, 102d, 102e may be any type of apparatus or device configured to operate or communicate in a wireless environment. Although each WTRU 102a, 102b, 102c, 102d, 102e is depicted in FIGS. 29A-29E as a hand-held wireless communications apparatus, it is understood that with the wide variety of use cases contemplated for 5G wireless communications, each WTRU may comprise or be in any type of apparatus or device configured to transmit or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, or the other networks 112. Base stations 114b may be any type of device configured to wiredly and/or wirelessly interface with at least one of the RRHs (Remote Radio Heads) 118a, 118b and/or TRPs (Transmission and Reception Points) 119a, 119b to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations or network elements.

The base station 114a may be part of the RAN 103/104/105, which may also include other base stations or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an example, the base station 114a may include three transceivers, e.g., one for each sector of the cell. In an example, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) or Evolved HSPA (HSPA+). HSPA may include High-Speed Downlink Packet Access (HSDPA) or High-Speed Uplink Packet Access (HSUPA).

In an example, the base station 114a and the WTRUs 102a, 102b, 102, or RRHs 118a, 118b and TRPs 119a, 119b in the RAN 103b/104b/105b and the WTRUs 102c, 102d,c may implement a radio technology such as Evolved UMTS Terrestrial Radio Access (E-UTRA), which may establish the air interface 115/116/117 or 115c/116c/117c respectively using Long Term Evolution (LTE) or LTE-Advanced (LTE-A). In the future, the air interface 115/116/117 may implement 3GPP NR technology.

In an example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement radio technologies such as IEEE 802.16 (e.g., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 29A may be a wireless router, Home Node B, Home eNode B, or access point, for example, and may utilize any suitable RAT for facilitating wireless connectivity in a localized area, such as a place of business, a home, a vehicle, a campus, and the like, for implementing the methods and systems of beam management, as disclosed herein. In an example, the base station 114c and the WTRUs 102e, may implement a radio technology such as IEEE 802.11 to establish a wireless local area network (WLAN). In an example, the base station 114c and the WTRUs 102d, may implement a radio technology such as IEEE 802.15 to establish a wireless personal area network (WPAN). In yet another example, the base station 114c and the WTRUs 102e, may utilize a cellular-based RAT (e.g., WCDMA, CDMA2000, GSM, LTE, LTE-A, etc.) to establish a picocell or femtocell. As shown in FIG. 29A, the base station 114b may have a direct connection to the Internet 110. Thus, the base station 114c may not be required to access the Internet 110 via the core network 106/107/109.

The RAN 103/104/105 or RAN 103b/104b/105b may be in communication with the core network 106/107/109, which may be any type of network configured to provide voice, data, applications, or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., or perform high-level security functions, such as user authentication.

Although not shown in FIG. 29A, it will be appreciated that the RAN 103/104/105 or RAN 103b/104b/105b or the core network 106/107/109 may be in direct or RAN 103b/104b/105b or indirect communication with other RANs that employ the same RAT as the RAN 103/104/105 or a different RAT. For example, in addition to being connected to the RAN 103/104/105 or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned or operated by other service providers. For example, the networks 112 may include another core network connected to one or more RANs, which may employ the same RAT as the RAN 103/104/105 or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links for implementing the methods and systems of beam management, as disclosed herein. For example, the WTRU 102e shown in FIG. 29A may be configured to communicate with the base station 114a, which may employ a cellular-based radio technology, and with the base station 114c, which may employ an IEEE 802 radio technology.

Figure 29B:
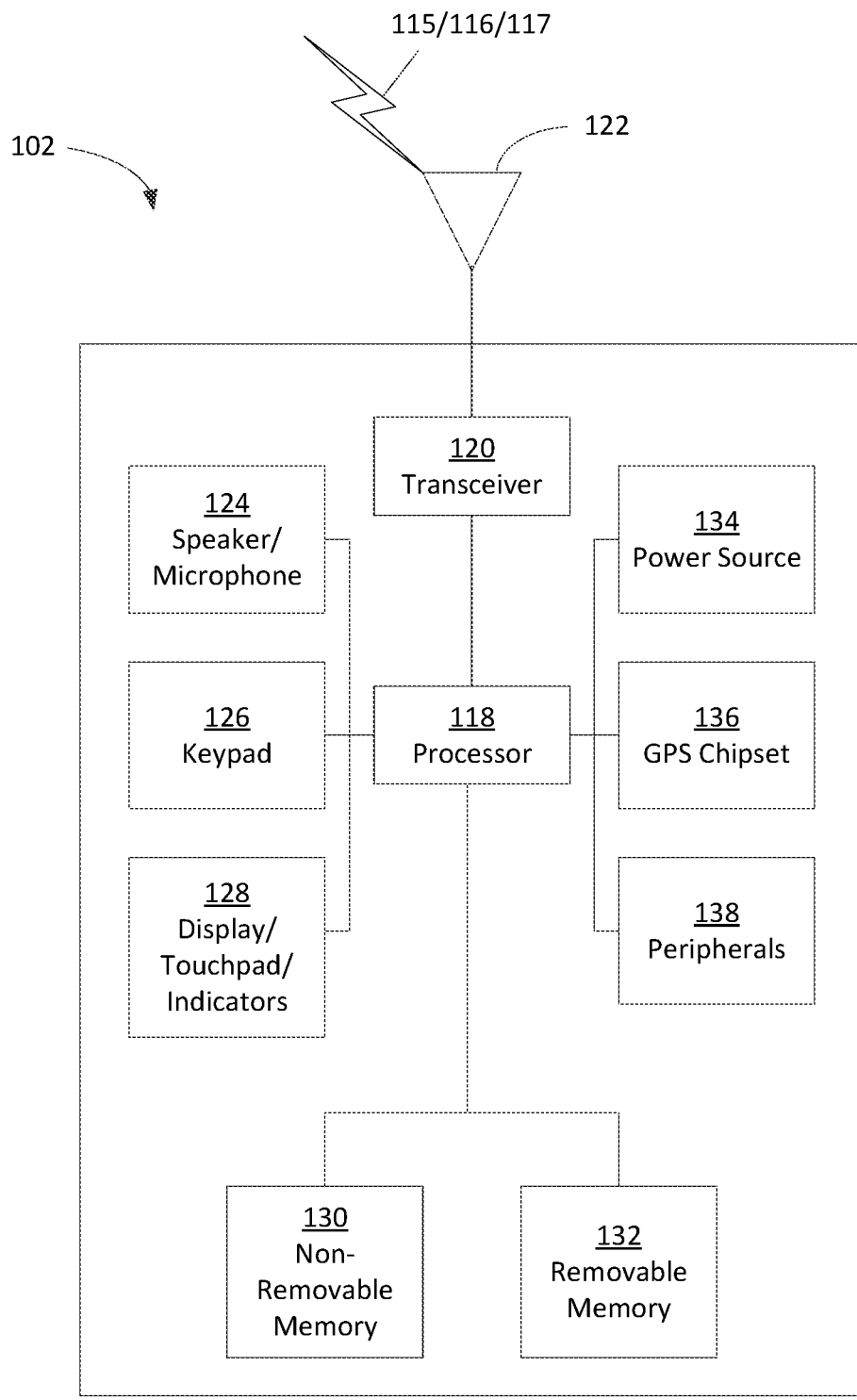
FIG. 29B is a block diagram of an example apparatus or device configured for wireless communications in accordance with the beam management illustrated herein.

FIG. 29B is a block diagram of an example apparatus or device configured for wireless communications in accordance with implementing the methods and systems of beam management, as disclosed herein, such as for example, a WTRU 102 (e.g., UE 205). As shown in FIG. 29B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an example. Also, the base stations 114a and 114b, or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 29B and may be an exemplary implementation that performs the disclosed methods and systems of beam management, as disclosed herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, or any other functionality that enables the WTRU 102 to operate in a wireless environment. The processor 118 may be coupled to the transceiver 120, which may be coupled to the transmit/receive element 122. While FIG. 29B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, the transmit/receive element 122 may be an antenna configured to transmit or receive RF signals. Although not shown in FIG. 29A, it will be appreciated that the RAN 103/104/105 or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, and 102d may include multiple transceivers for communicating with different wireless networks over different wireless links. For example, the WTRU 102c shown in FIG. 29A may be configured to communicate with the base station 114a, which may employ a cellular-based radio technology, and with the base station 114b, which may employ an IEEE 802 radio technology.

FIG. 29B is a block diagram of an example apparatus or device configured for wireless communications in accordance with the examples illustrated herein, such as for example, a WTRU 102. As shown in FIG. 29B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an example. Also, contemplated herein through the examples are that the base stations 114a and 114b, or the nodes that base stations 114a and 114b may represent, such as but not limited to a transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 29B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, or any other functionality that enables the WTRU 102 to operate in a wireless environment. The processor 118 may be coupled to the transceiver 120, which may be coupled to the transmit/receive element 122. While FIG. 29B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, the transmit/receive element 122 may be an antenna configured to transmit or receive RF signals. In an example, the transmit/receive element 122 may be an emitter/detector configured to transmit or receive IR, UV, or visible light signals, for example. In yet another example, the transmit/receive element 122 may be configured to transmit and receive both RF and light signals. It will be appreciated that the transmit/receive element 122 may be configured to transmit or receive any combination of wireless signals.

In addition, although the transmit/receive element 122 is depicted in FIG. 29B as a single element, the WTRU 102 may include any number of transmit/receive elements 122. More specifically, the WTRU 102 may employ MIMO technology. Thus, in an example, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, or the display/touchpad/indicators 128 (e.g., a liquid crystal display (LCD) display unit or organic light-emitting diode (OLED) display unit). The processor 118 may also output user data to the speaker/microphone 124, the keypad 126, or the display/touchpad/indicators 128. In addition, the processor 118 may access information from, and store data in, any type of suitable memory, such as the non-removable memory 130 or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an example, the processor 118 may access information from, and store data in, memory that is not physically located on the WTRU 102, such as on a server or a home computer (not shown). The processor 118 may be configured to control lighting patterns, images, or colors on the display or indicators 128 in response to whether the setup of some of the beam management procedures in some of the examples described herein are successful or unsuccessful, or otherwise indicate a status of beam mangement and associated components. The control lighting patterns, images, or colors on the display or indicators 128 may be reflective of the status of any of the method flows or components in the FIG.'s illustrated or discussed herein (e.g., FIG. 20-FIG. 28, etc). Disclosed herein are messages and procedures of beam management. The messages and procedures may be extended to provide interface/API for users to request resource-related resources via an input source (e.g., speaker/microphone 124, keypad 126, or display/touchpad/indicators 128) and request, configure, or query beam management related information, among other things that may be displayed on display 128.

The processor 118 may receive power from the power source 134, and may be configured to distribute or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) or determine its location based on the timing of the signals being received from two or more nearby base stations. It will be appreciated that the WTRU 102 may acquire location information by way of any suitable location-determination method while remaining consistent with an example.

The processor 118 may further be coupled to other peripherals 138, which may include one or more software or hardware modules that provide additional features, functionality or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102, as disclosed, may be other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 29C:
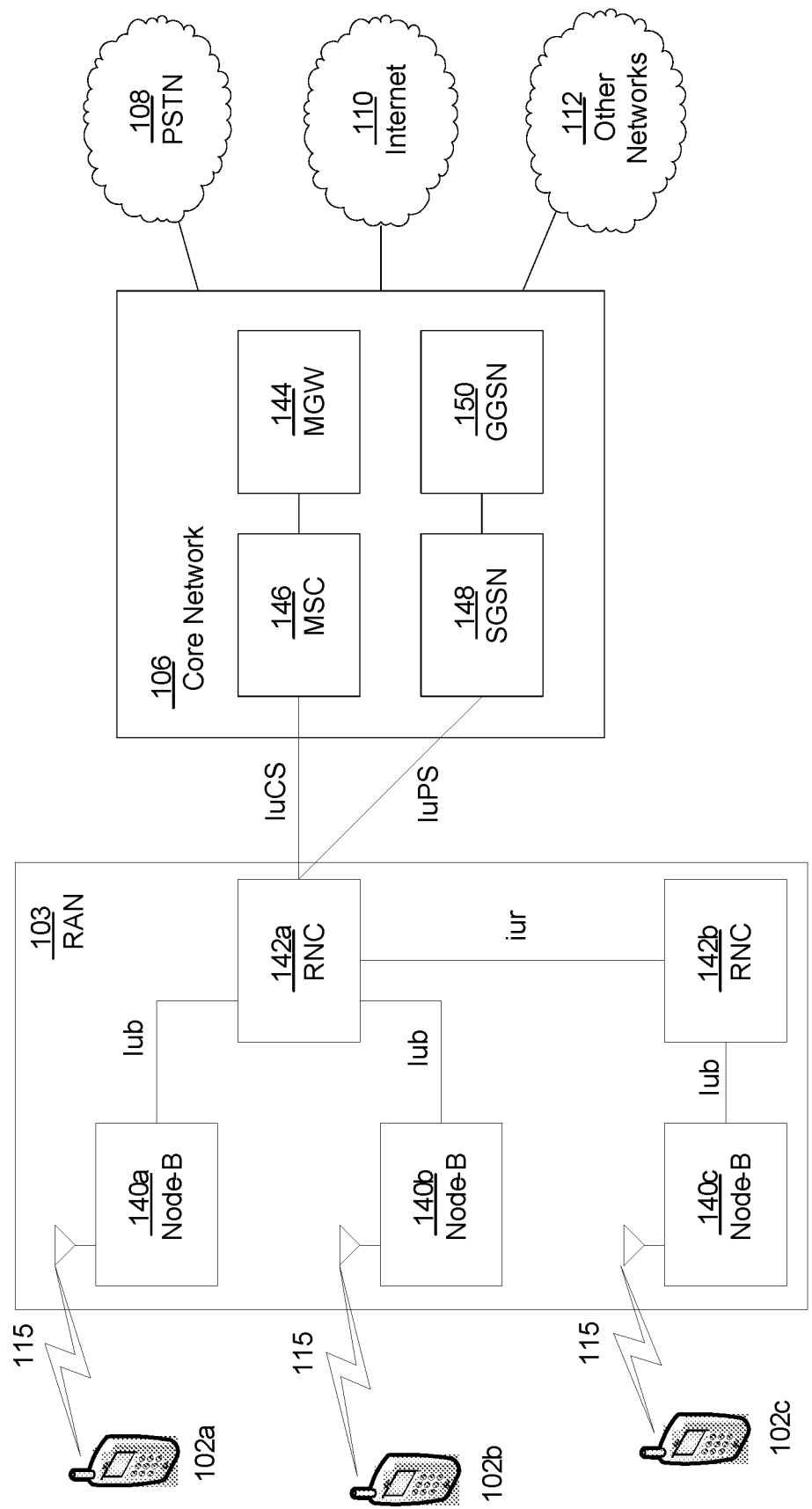
FIG. 29C is a system diagram of the RAN 103 and the core network 106 according to beam management as discussed herein.

FIG. 29C is a system diagram of the RAN 103 and the core network 106 according to beam management as discussed herein. As noted above, the RAN 103 may employ a UTRA radio technology to communicate with the WTRUs 102a, 102b, and 102c over the air interface 115. The RAN 103 may also be in communication with the core network 106. As shown in FIG. 29C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an example.

As shown in FIG. 29C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 29C may include a media gateway (MGW) 144, a mobile switching center (MSC) 146, a serving GPRS support node (SGSN) 148, or a gateway GPRS support node (GGSN) 150. While each of the foregoing elements are depicted as part of the core network 106, it will be appreciated that any one of these elements may be owned or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned or operated by other service providers.

Figure 29D:
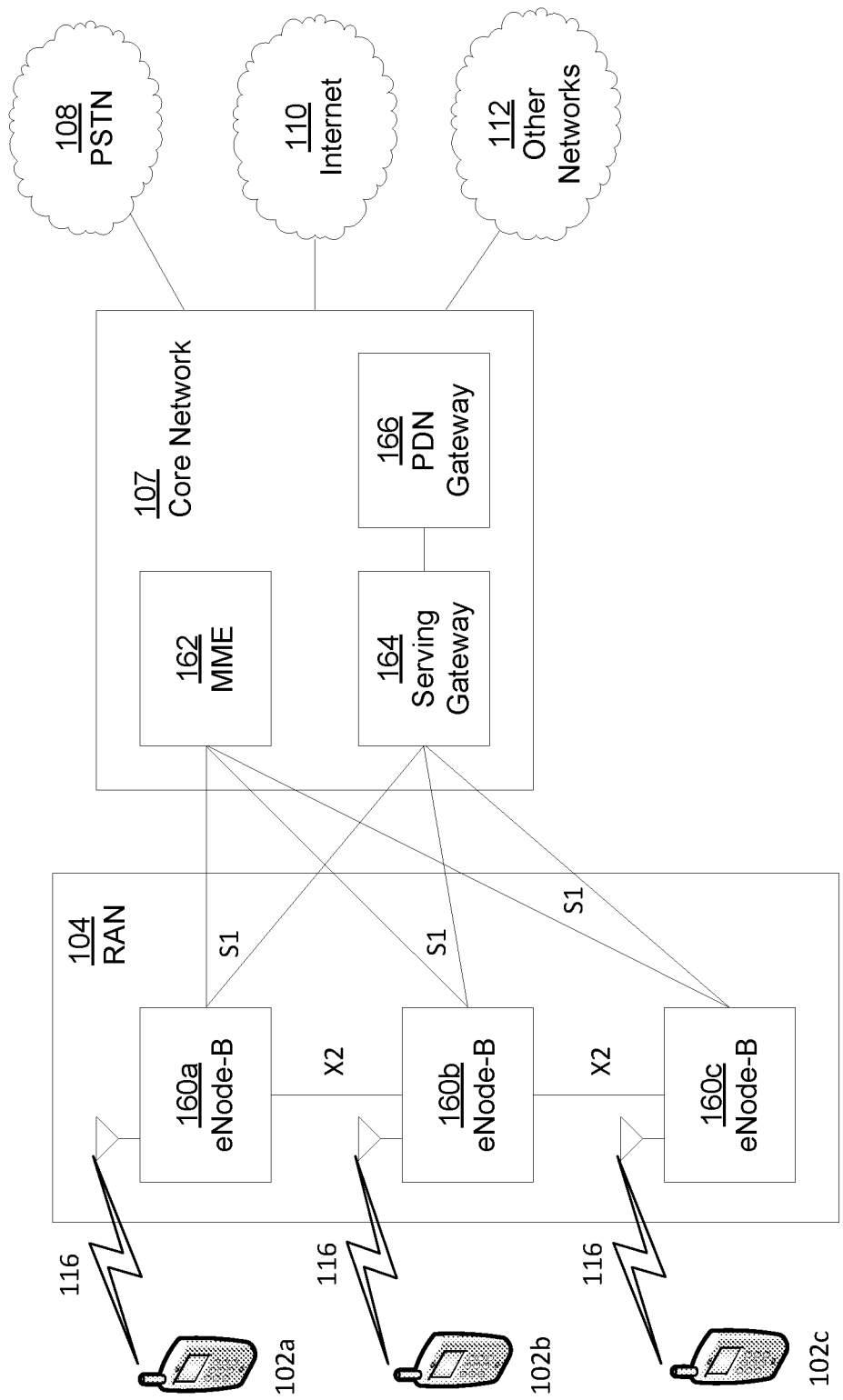
FIG. 29D is a system diagram of the RAN 104 and the core network 107 according to beam management as discussed herein.

FIG. 29D is a system diagram of the RAN 104 and the core network 107 according to beam management as discussed herein. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an example. The eNode-Bs 160a, 160b, 160c may each include one or more transceivers for communicating with the WTRUs 102a, 102b, 102c over the air interface 116. In an example, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink or downlink, and the like. As shown in FIG. 29D, the eNode-Bs 160a, 160b, 160c may communicate with one another over an X2 interface.

The core network 107 shown in FIG. 29D may include a mobility management gateway (MME) 162, a serving gateway 164, and a packet data network (PDN) gateway 166. While each of the foregoing elements are depicted as part of the core network 107, it will be appreciated that any one of these elements may be owned or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned or operated by other service providers.

Figure 29E:
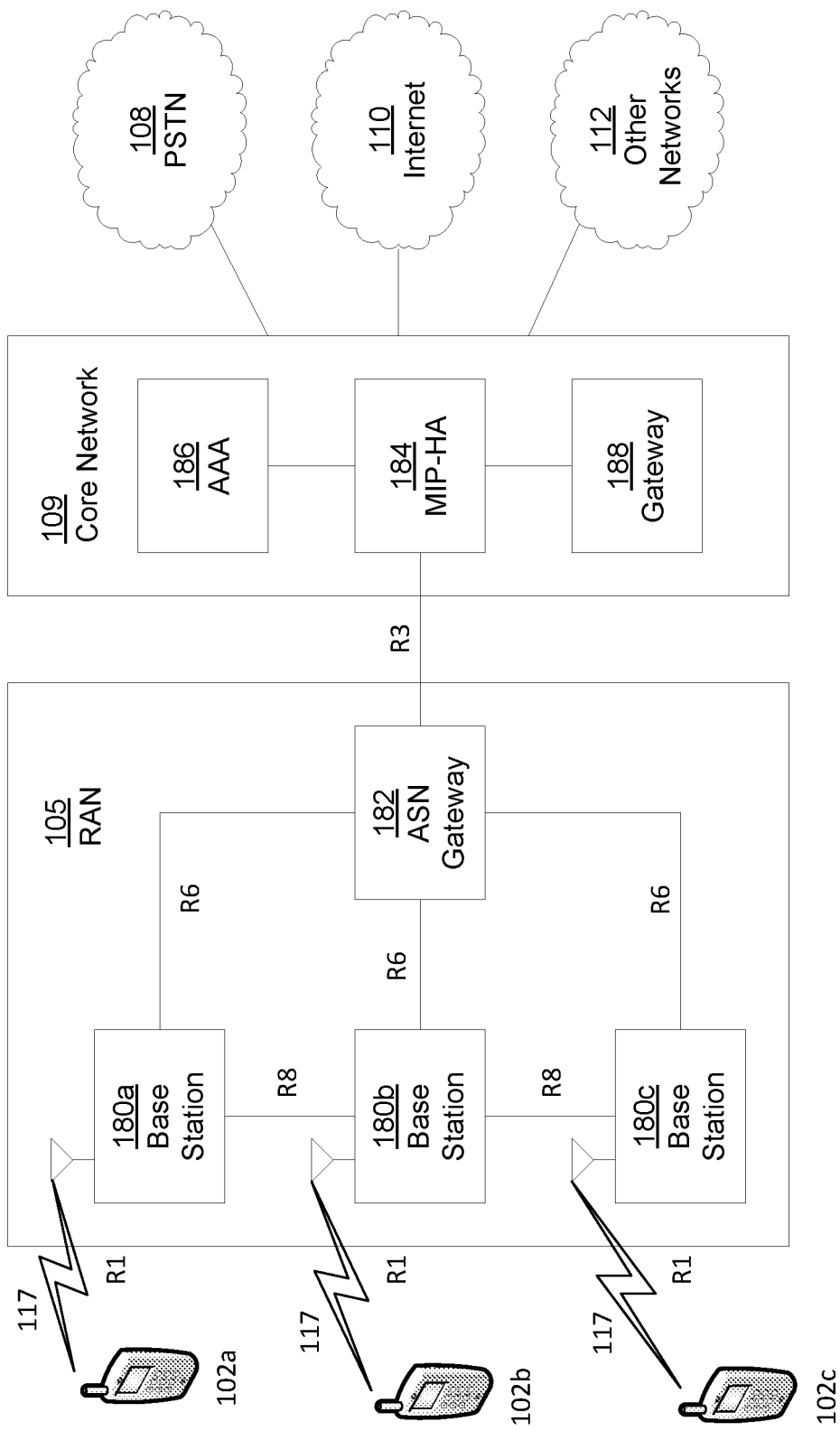
FIG. 29E is a system diagram of the RAN 105 and the core network 109 which may be associated with beam management as discussed herein.

FIG. 29E is a system diagram of the RAN 105 and the core network 109 which may be associated with beam management as discussed herein. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 29E, the RAN 105 may include base stations 180a, 180b, 180c, and an ASN gateway 182, though it will be appreciated that the RAN 105 may include any number of base stations and ASN gateways while remaining consistent with an example. The base stations 180a, 180b, 180c may each be associated with a particular cell in the RAN 105 and may include one or more transceivers for communicating with the WTRUs 102a, 102b, 102c over the air interface 117. In an example, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 29E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned or operated by an entity other than the core network operator.

The MIP-HA may be responsible for IP address management, and may enable the WTRUs 102a, 102b, and 102c to roam between different ASNs or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned or operated by other service providers.

Although not shown in FIG. 29E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 29A, 29C, 29D, and 29E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 29A, 29B, 29C, 29D, and 29E are provided by way of example only, and it is understood that the subject matter disclosed and claimed herein may be implemented in any similar communication system, whether presently defined or defined in the future. Nodes in FIG. 29A-29E (e.g., nodeB 140a, eNode-B 160a, base station 180b), may be associated with NW nodes discussed in FIG. 20-FIG. 28, among others.

Figure 29F:
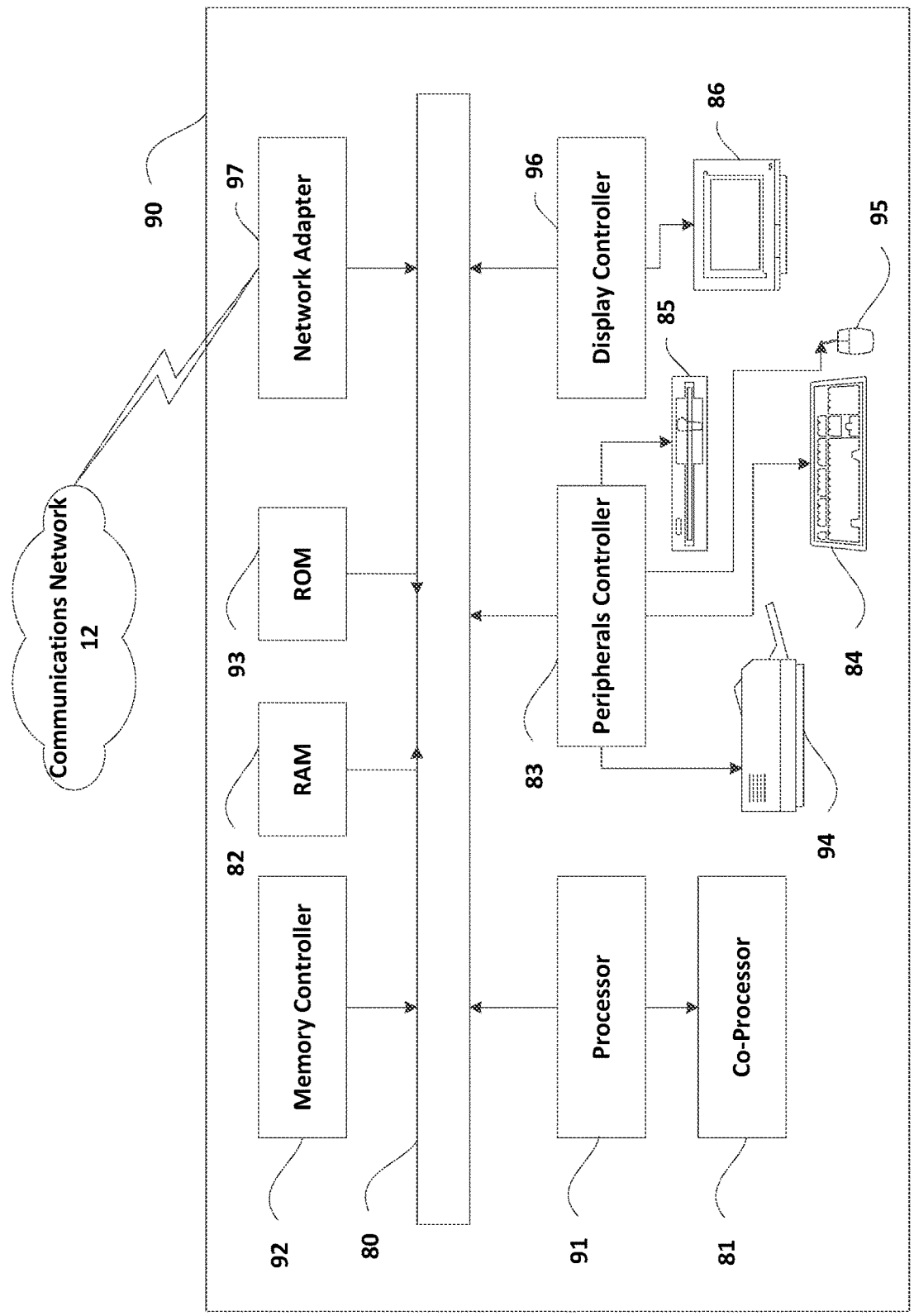
FIG. 29F is a block diagram of an exemplary computing system 90 in which one or more apparatuses of the communications networks illustrated in FIGS. 29A, 29C, 29D, and 29E may be associated with beam management as discussed herein.

FIG. 29F is a block diagram of an exemplary computing system 90 in which one or more apparatuses of the communications networks illustrated in FIGS. 29A, 29C, 29D and 29E may be used in, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, or any other functionality that enables the computing system 90 to operate in a communications network. Coprocessor 81 is an optional processor, distinct from main processor 91, that may perform additional functions or assist processor 91. Processor 91 or coprocessor 81 may receive, generate, and process data related to the methods and apparatuses disclosed herein for beam management.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 29A, 29B, 29C, 29D, and 29E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be used in the form of computer executable instructions (e.g., program code) stored on a computer-readable storage medium which instructions, when executed by a processor, such as processors 118 or 91, cause the processor to perform or implement the systems, methods and processes described herein. Specifically, any of the steps, operations or functions described herein may be implemented in the form of such computer executable instructions, executing on the processor of an apparatus or computing system configured for wireless or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

In describing preferred methods, systems, or apparatuses of the subject matter of the present disclosure—beam management—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein. The terms MAC layer, MAC entity, MAC, MAC sublayer, or the like are generally used interchangeable. A MAC entity may be viewed as the part of the apparatus that performs the MAC functions; i.e. the implementation of the MAC layer. In some scenarios; e.g. dual connectivity, there may be multiple MAC entities in the apparatus. To simplify the disclosure, generally the examples herein show there is one MAC entity in the UE and another MAC entity in the gNB. These are considered peer MAC entities when referring to MAC layer communication between the UE and gNB. Further, although "greater than" and "less than" a threshold is disclosed (e.g., Table 4), the terms within a threshold or reaching a threshold may be used to encompass the "greater than" and "less than" terminology.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

Methods, systems, and apparatuses, among other things, as described herein may be associated with beam management, such as beam aggregation with carrier aggregation. A method, system, computer readable storage medium, or apparatus has means that include a medium access control (MAC) layer that maps: 1) a first transport block to a first scheduled serving beam and a second transport block to a second scheduled serving beam. The apparatus may be a user equipment (UE). The MAC layer may multiplex a first radio link control to the first transport block and a second link control to a second transport block. The mapping may be based on user equipment measurement. The user equipment measurement may include reference signal received power, reference signal received quality, received signal strength indicator, NR-RSRP, or reference signal to noise and interference ratio. The mapping may be based on a network node measurement. The network node measurement may include NR-RSRP for one or more beams. The first scheduled serving beam may be mapped to a first hybrid automatic repeat request (HARQ), and the second scheduled serving beam may be mapped to a second HARQ. All combinations in this paragraph (including the removal or addition of steps) are contemplated in a manner that is consistent with the other portions of the detailed description.

Methods, systems, and apparatuses, among other things, as described herein may be associated with beam management, such as beam aggregation with carrier aggregation. A method, system, computer readable storage medium, or apparatus has means that include a medium access control (MAC) layer that maps a first transport block to a first pair of first beam and first component carrier, and a second transport block to a second pair of second beam and second component carrier. The first transport block may map to a first transmission time interval (TTI) and the second transport block maps to a second TTI. The first transport block may map to a first hybrid automatic repeat request (HARQ), and the second transport block may map to a second HARQ. The apparatus may be a user equipment (UE). The MAC layer may perform logical channel prioritization and scheduling. The MAC layer may perform logical channel prioritization and scheduling based on grant from a base station. The base station may be a gNB. The new radio (NR) access technology may replace LTE or the like technologies and the new base station may be called gNB (or gNodeB) (e.g., replace the eNodeB of LTE or the like). The apparatus may be a network node. All combinations in this paragraph (including the removal or addition of steps) are contemplated in a manner that is consistent with the other portions of the detailed description.

Methods, systems, and apparatuses, among other things, as described herein may be associated with beam management, such as beam aggregation with carrier aggregation. A method, system, computer readable storage medium, or apparatus has means that include providing a beam training command and a beam index of a beam and responsive to providing the beam training command, receiving a beam training reference signal (BT-RS). The beam training reference signal may be associated with beam sweeping. The beam training command may include an LCID value. The method, system, computer readable storage medium, or apparatus has means that include upon receiving the beam training reference signal performing measurements. The measurements may be performed on the beam training reference signal. The measurements may include reference signal received power, reference signal received quality, received signal strength indicator, NR-RSRP, or reference signal to noise and interference ratio. The beam index may be used by a MAC layer to look up a beam identity. The measurements may be transmitted to a peer MAC entity in a measurement report. The beam index may be used by the MAC layer to look up associated characteristics of a beam. The method, system, computer readable storage medium, or apparatus has means that include displaying a beam training reference signal. The apparatus may be a user equipment (UE). The method, system, computer readable storage medium, or apparatus has means that include in response to receiving a beam training reference signal, performing measurements on the beam training reference signal; based on the measurements on the beam training reference signal and traffic distribution of a wireless network, determining that a threshold measurement associated with one or more beams has been reached, wherein a first beam of the one or more beams is identified by the beam index; and based on the determining that the threshold measurement associated with the one or more beams has been reached, providing instructions to configure the one or more beams, the instructions comprising a beam release command or a beam addition command. The method, system, computer readable storage medium, or apparatus has means that include in response to receiving a beam training reference signal, performing measurements on the beam training reference signal; based on the measurements on the beam training reference signal, determining that a threshold measurement associated with one or more beams has been reached, wherein a first beam of the one or more beams is identified by the beam index; and based on the determining that the threshold measurement associated with the one or more beams has been reached, providing instructions to report at least a first beam measurement of the one or more beams (or other LCIDs) to a peer medium access control layer. A first beam of the one or more beams may identified by the beam index and wherein the threshold measurement may be a number (e.g., an amount) of serving beams. The threshold measurement may be a number of candidate beams. The report of the at least first beam measurement of the one or more beams to the peer medium access control layer may be within a medium access control layer control element. The medium access control layer control element may be identified by a MAC protocol data unit subheader with a logical channel identifier. The logical channel identifier may include values that correspond to beam measurement or a beam training command, a beam alignment command, a beam tracking command, a beam addition command, or a beam release command. All combinations in this paragraph (including the removal or addition of steps) are contemplated in a manner that is consistent with the other portions of the detailed description.

What is claimed:

1. An apparatus for wireless communication, the apparatus comprising:
a processor; and
a memory coupled with the processor, the memory storing executable instructions that when executed by the processor cause the processor to effectuate operations comprising:
communicating with a user equipment via a first beam, the first beam configured as a serving beam;
transmitting beam reference signals to the user equipment, the beam reference signals used for measurements on a plurality of beams including the first beam and a second beam based on the beam reference signals, the second beam not configured as a serving beam;
receiving a feedback based on the measurements from the user equipment;
transmitting to the user equipment a beam addition/release command in a medium access control—control element (MAC-CE), the beam addition/release command comprising a plurality of bit field, each of the plurality of bit field is set to 1 or 0 denoting addition or release of corresponding beam; and
controlling addition or release of one or more beams to or from the set of serving beams based on the beam addition/release command.

2. The apparatus of claim 1, the operations further comprising obtaining a report of the measurements from the user equipment.

3. The apparatus of claim 1, wherein the second beam is a candidate beam.

4. The apparatus of claim 1, the operations further comprising obtaining a report of the measurements from the user equipment based on a measurement reaching a threshold.

5. The apparatus of claim 1, the operations further comprising scheduling assignments via the serving beam for scheduling assignments.

6. The apparatus of claim 1, wherein the measurements comprises reference signal received power.

7. The apparatus of claim 1, wherein the apparatus is a gNodeB.

8. An apparatus for wireless communication, the apparatus comprising:
a processor; and
a memory coupled with the processor, the memory storing executable instructions that when executed by the processor cause the processor to effectuate operations comprising:
communicating with a network node via a first beam, the first beam configured as a serving beam;
performing measurements on a plurality of beams including the first beam and a second beam based on the beam reference signals, the second beam not configured as a serving beam;
transmitting a feedback based on the measurements on the plurality of beams;
receiving a beam addition/release command in medium access control—control element (MAC-CE) from the network node, the beam addition/release command comprising a plurality of bit fields, each bit field of the plurality of bit fields set to 1 or 0 which denotes addition or release of a corresponding beam; and
controlling addition or release of one or more beams to or from the set of serving beams based on the beam addition/release command.

9. The apparatus of claim 8, the operations further comprising reporting the measurements to the network node.

10. The apparatus of claim 8, wherein the second beam is a candidate beam.

11. The apparatus of claim 8, the operations further comprising based on a measurement reaching a threshold, reporting the measurement to the network node.

12. The apparatus of claim 8, wherein the measurements comprises reference signal received power.

13. The apparatus of claim 8, the operations further comprising monitoring a serving beam for scheduling assignments.

14. The apparatus of claim 8, wherein the apparatus is a user equipment (UE).

15. A computer readable storage medium, which is not a signal per se, storing computer executable instructions that when executed by a computing device cause said computing device to effectuate operations comprising:
communicating with a network node via a first beam, the first beam configured as a serving beam;
performing measurements on a plurality of beams including the first beam and a second beam based on the beam reference signals, the second beam not configured in the set of serving beams;
transmitting a feedback based on the measurements on the plurality of beams;
receiving a beam addition/release command in medium access control—control element (MAC-CE) from the network node, the beam addition/release command comprising a plurality of bit fields, each bit field of the plurality of bit fields set to 1 or 0 which denotes addition or release of a corresponding beam; and
controlling addition or release of one or more beams to or from the set of serving beams based on the beam addition/release command.

16. The computer readable storage medium of claim 15, the operations further comprising reporting the measurements to the network node.

17. The computer readable storage medium of claim 15, wherein the second beam is a candidate beam.

18. The computer readable storage medium of claim 15, the operations further comprising based on a measurement reaching a threshold, reporting the measurement to the network node.

19. The computer readable storage medium of claim 15, wherein the measurements comprises reference signal received power.

20. The computer readable storage medium of claim 15, the operations further comprising monitoring a serving beam for scheduling assignments.

* * * * *